United States Patent
Okuno et al.

(10) Patent No.: US 11,969,675 B2
(45) Date of Patent: Apr. 30, 2024

(54) INLINE-TYPE STRAINER

(71) Applicant: Three-M Industry Co., Ltd., Osaka (JP)

(72) Inventors: Hideo Okuno, Osaka (JP); Takeshi Takahashi, Osaka (JP); Takanori Hashihira, Osaka (JP); Ichiro Morita, Osaka (JP)

(73) Assignee: Three-M Industry Co., Ltd., Osaka (JP)

(*) Notice: Subject to any disclaimer, the term of this patent is extended or adjusted under 35 U.S.C. 154(b) by 470 days.

(21) Appl. No.: 17/593,574

(22) PCT Filed: Apr. 6, 2020

(86) PCT No.: PCT/JP2020/015582
§ 371 (c)(1),
(2) Date: Sep. 21, 2021

(87) PCT Pub. No.: WO2020/230475
PCT Pub. Date: Nov. 19, 2020

(65) Prior Publication Data
US 2022/0184535 A1    Jun. 16, 2022

(30) Foreign Application Priority Data
May 15, 2019   (JP) ................................ 2019-092226

(51) Int. Cl.
*B01D 29/66* (2006.01)
*B01D 29/23* (2006.01)
(Continued)

(52) U.S. Cl.
CPC ............ *B01D 29/66* (2013.01); *B01D 29/23* (2013.01); *B01D 29/908* (2013.01); *B01D 29/94* (2013.01);
(Continued)

(58) Field of Classification Search
None
See application file for complete search history.

(56) References Cited

U.S. PATENT DOCUMENTS

| 3,959,140 | A  |   | 5/1976 | Legras |             |
|-----------|----|---|--------|--------|-------------|
| 4,582,605 | A  | * | 4/1986 | Rea    | B01D 29/35  |
|           |    |   |        |        | 210/450     |
| 11,745,126| B2 | * | 9/2023 | Ismert | B01D 35/30  |
|           |    |   |        |        | 210/238     |

FOREIGN PATENT DOCUMENTS

| JP | 47-28563 A  | 11/1972 |
| JP | 48-23055 B1 | 3/1973  |

(Continued)

OTHER PUBLICATIONS

International Search Report (PCT/ISA/210) issued in PCT Application No. PCT/JP2020/015582 dated Jun. 23, 2020 with English translation (seven (7) pages).

(Continued)

*Primary Examiner* — Krishnan S Menon
(74) *Attorney, Agent, or Firm* — Crowell & Moring LLP

(57) ABSTRACT

An inline-type strainer including a drain line and a screen configured to be attachable to and detachable from a housing is provided. A screen is supported to be attachable to and detachable from a lid. A lid coupling mechanism that couples a housing and the lid when the lid is attached to the housing is provided between a bottom surface of the housing facing the filter chamber and a lower end of the lid. A lower discharge flow path is formed in a lower coupling element on a side close to the housing constituting the lid coupling mechanism, and an upper discharge flow path is formed in the upper coupling element on a side close to the lid constituting the lid coupling mechanism. When the lid is attached to the housing, a coupling state is established between the upper and lower coupling elements, and the upper and lower discharge flow paths communicate with each other, and thus a drain line is constructed.

10 Claims, 17 Drawing Sheets

(51) Int. Cl.
  *B01D 29/90* (2006.01)
  *B01D 29/94* (2006.01)
  *B01D 35/02* (2006.01)
  *B01D 41/04* (2006.01)
  *F16L 55/24* (2006.01)
(52) U.S. Cl.
  CPC ............ *B01D 35/02* (2013.01); *B01D 41/04* (2013.01); *F16L 55/24* (2013.01); *B01D 2201/0423* (2013.01); *B01D 2201/16* (2013.01); *B01D 2201/301* (2013.01); *B01D 2201/4092* (2013.01)

(56) References Cited

FOREIGN PATENT DOCUMENTS

| JP | 48-30961 Y | 9/1973 |
|---|---|---|
| JP | 48-90261 Y | 10/1973 |
| JP | 50-71132 A | 6/1975 |
| JP | 57-106420 U | 6/1982 |
| JP | 60-115505 U | 8/1985 |
| JP | 3-46828 Y2 | 10/1991 |
| JP | 5-60508 U | 8/1993 |
| JP | 5-245314 A | 9/1993 |
| JP | 11-244622 A | 9/1999 |
| JP | 2014-178000 A | 9/2014 |
| JP | 2016-59874 A | 4/2016 |
| JP | 2018-79403 A | 5/2018 |
| JP | 2018079403 A * | 5/2018 |
| WO | WO 2018/151316 A1 | 8/2018 |

OTHER PUBLICATIONS

Japanese-language Written Opinion (PCT/ISA/237) issued in PCT Application No. PCT/JP2020/015582 dated Jun. 23, 2020 (four (4) pages).

* cited by examiner

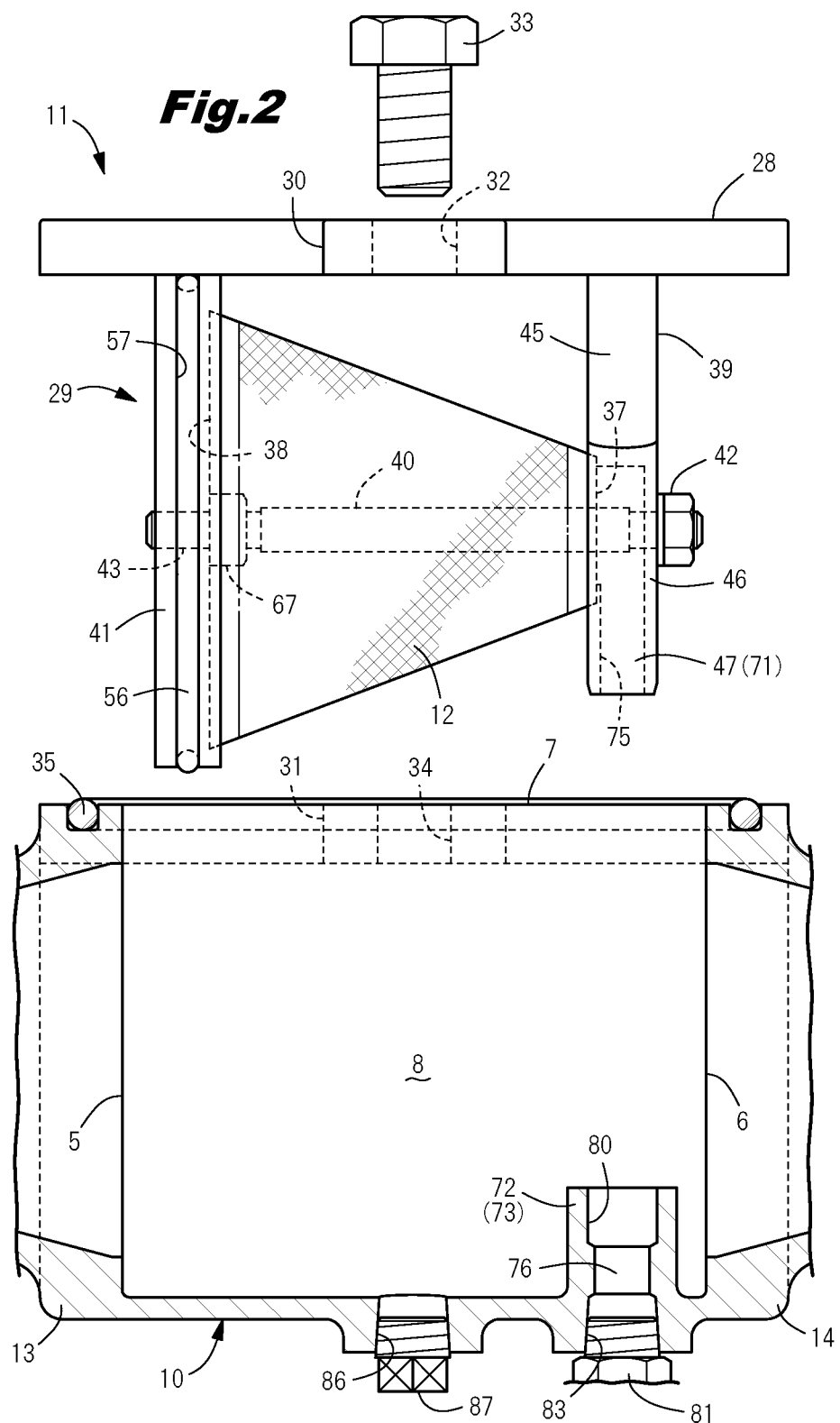

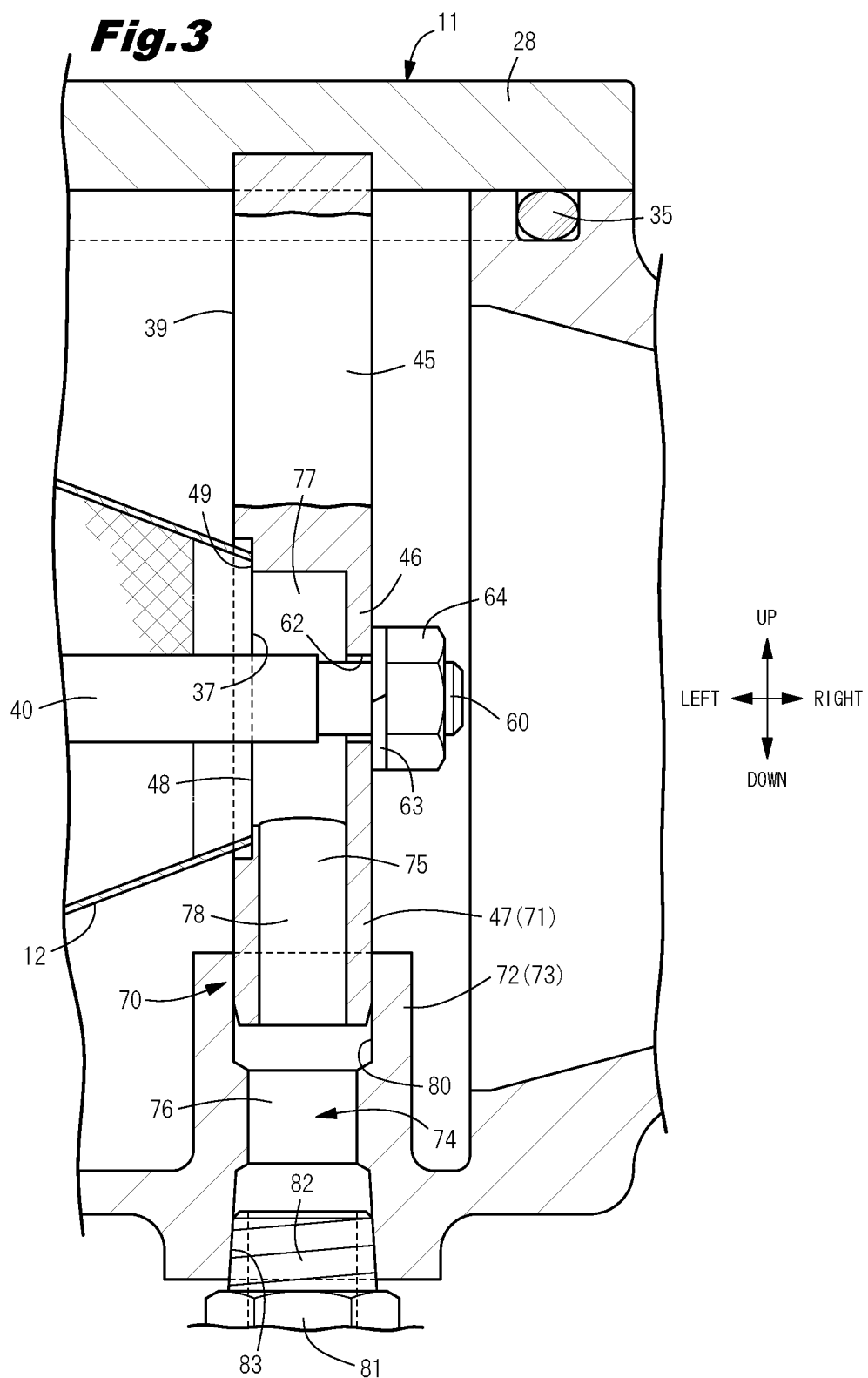

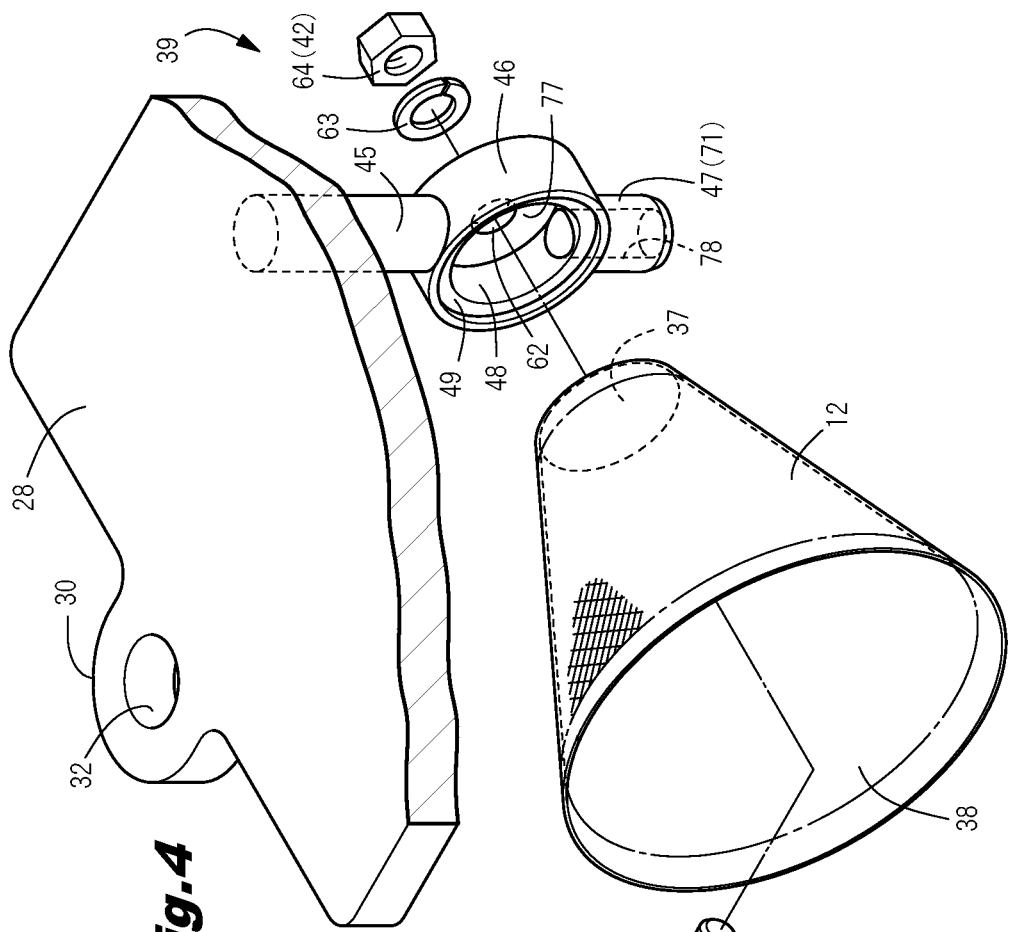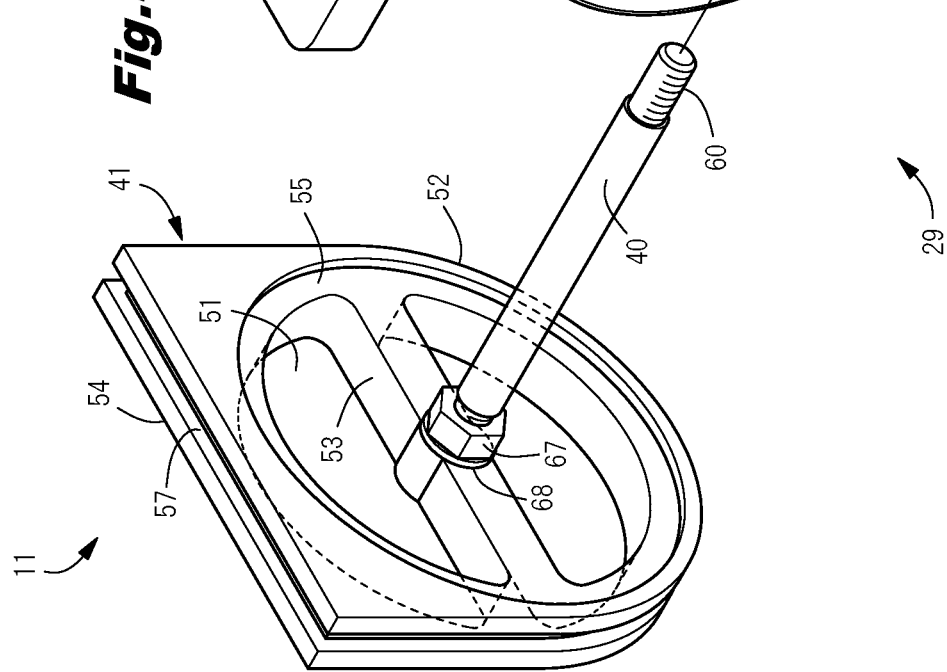

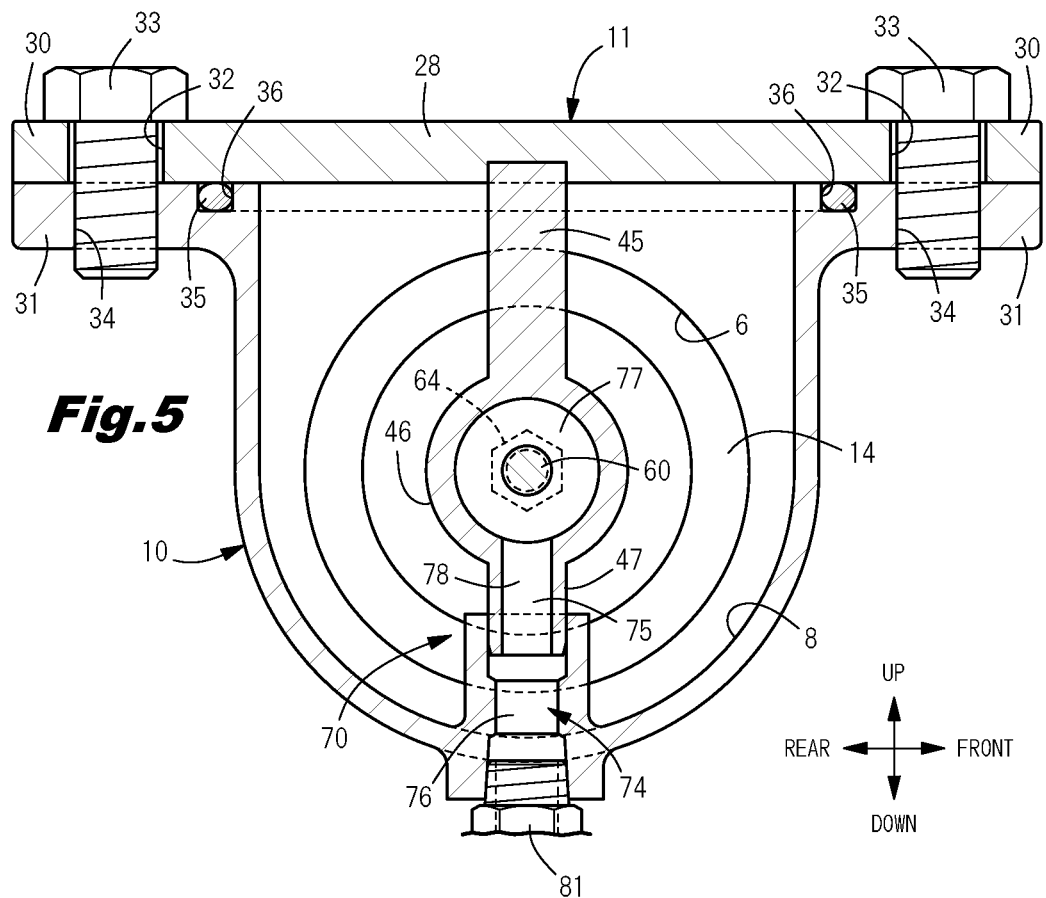

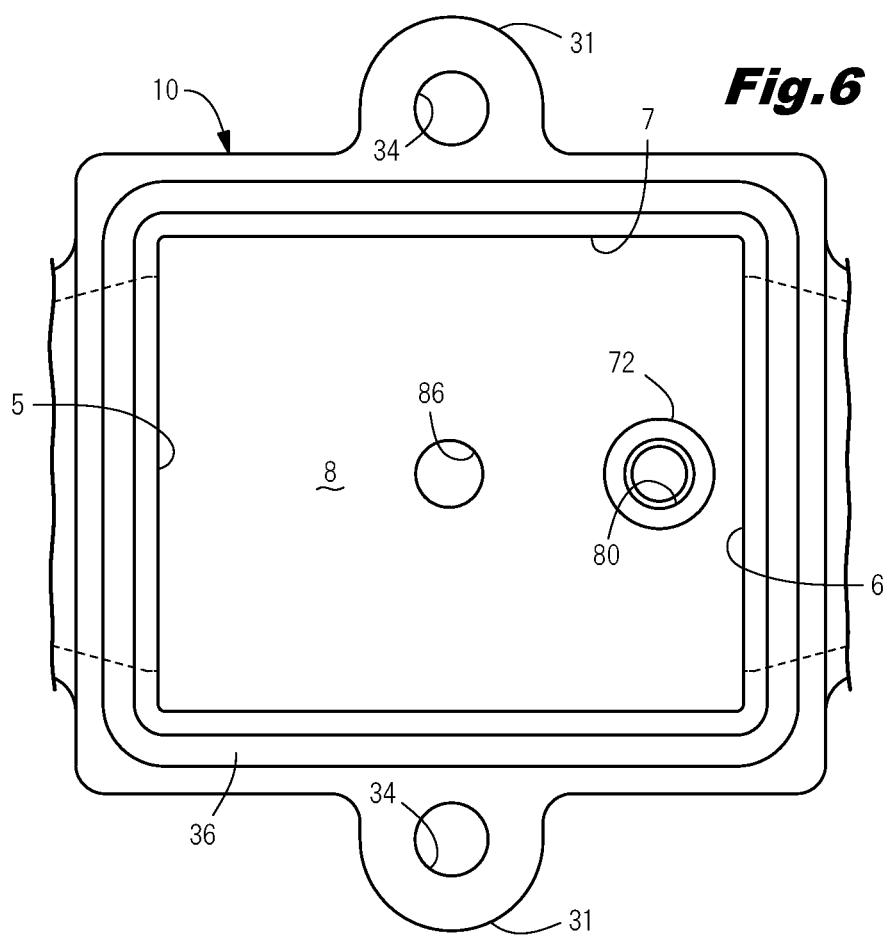

INLINE-TYPE STRAINER

TECHNICAL FIELD

The present invention relates to an inline-type strainer incorporated in a piping line through which liquid passes and filtering foreign matters included in the liquid.

BACKGROUND ART

In this type of inline-type strainer, foreign matters contained in liquid is held by a screen as a filter element, and clogging may occur. In order to eliminate such clogging of the strainer, it is known to connect a drain line reaching outside of a housing (strainer body) to a downstream end of the screen as disclosed in Patent Literatures 1 to 3. When the drain line is provided at the downstream end of the screen as described above, foreign matters held on an inner surface of the screen can be discharged to the outside of the housing by a fluid pressure by opening the drain line, and thus a filter surface of the screen can be reproduced in a state where the screen is installed inside the housing.

Meanwhile, it is known that the screen is configured to be attachable to and detachable from the housing such that the screen can be taken out from the housing as disclosed in Patent Literatures 4 and 5. Since the screen can be taken out from the housing in this manner, the screen can be cleaned outside the housing, and can be cleaned with visual confirmation. It is therefore possible to reproduce the filter surface of the screen more reliably than in a configuration in which the foreign matters are discharged through the drain line as described above. The screen is easily replaced, and the filter surface of the screen can be reproduced more reliably in this respect.

CITATIONS LIST

Patent Literatures

Patent Literature 1: JP 2014-178000 A
Patent Literature 2: JP H05-245314 A
Patent Literature 3: Microfilm of JP Utility Model Application No. S47-13398 (JP S48-90261 Y)
Patent Literature 4: Japanese Examined Utility Model Publication No. S48-30961
Patent Literature 5: Japanese Examined Utility Model Publication No. H03-46828

SUMMARY OF INVENTION

Technical Problems

The inventors have focused on a simple function of reproducing a filter surface in a strainer provided with a drain line and a reliable function of reproducing the filter surface in the strainer in which a screen is attachable to and detachable from a housing, and have attempted to develop the strainer having the two functions of reproducing the filter surface. That is, the inventors have attempted to develop the strainer provided with the drain line and provided with the screen attachable to and detachable from the housing. However, in the strainer provided with the two functions of reproducing the filter surface as described above, when the screen is taken out from the housing, it is necessary to release a connection state between the screen and the drain line or disassemble the drain line. When the screen is assembled in the housing, it is necessary to reestablish the connection state between the screen and the drain line or reconstruct the drain line. However, it is significantly difficult to disassemble and reconstruct the drain line inside the narrow housing, and the series of works inevitably takes time and effort.

An object of the present invention is to provide an inline-type strainer including a drain line and a screen attachable to and detachable from a housing, being capable of two types of cleaning of the screen, and having an excellent function of reproducing a filter surface, in which the drain line is easily disassembled when the screen is taken out from the housing, and the drain line is easily reconstructed when the screen is assembled in the housing, the inline-type strainer being excellent in terms of assembly and maintenance.

Solutions to Problems

An inline-type strainer of the present invention includes a housing 10 having an inflow port 5 opened at a first end in a left-right direction, an outflow port 6 opened at a second end in the left-right direction, and an access hole 7 opened in an upper part, the housing 10 including a filter chamber 8 inside extending from the inflow port 5 toward the outflow port 6, a lid 11 configured to be attachable to and detachable from the housing 10 to seal the access hole 7, a screen 12 disposed in the filter chamber 8 and configured to filter a liquid flowing in through the inflow port 5, a drain line 74 extending from a primary side of the screen 12 to an outside of the housing 10 and configured to discharge filtered residues adhering to a filter surface of the screen 12 to the outside of the housing 10, and a drain valve 84 configured to control opening and closing of the drain line 74. The screen 12 is supported to be attachable to and detachable from the lid 11, and the screen 12 can be entirely taken out to the outside of the housing 10 through the access hole 7 when the lid 11 is removed from the housing 10. A lid coupling mechanism 70 that couples the housing 10 and the lid 11 to each other when the lid 11 is attached to the housing 10 is provided between a bottom surface of the housing 10 facing the filter chamber 8 and a lower end of the lid 11. A lower discharge flow path 76 is formed in a lower coupling element 73 on a side close to the housing 10 constituting the lid coupling mechanism 70, and an upper discharge flow path 75 is formed in an upper coupling element 71 on a side close to the lid 11 constituting the lid coupling mechanism 70. When the lid 11 is attached to the housing 10, a coupling state is established between the upper and lower coupling elements 71 and 73, the upper and lower discharge flow paths 75 and 76 communicate with each other to construct the drain line 74. When the lid 11 is removed from the housing 10, the coupling state between the upper and lower coupling elements 71 and 73 is released.

The screen 12 has a bottomless cylindrical shape with a cylindrical inner surface as a primary side and a cylindrical outer surface as a secondary side. The lid 11 includes a lid body 28 that seals the access hole 7, and a screen support structure 29 that supports the screen 12 to be attachable and detachable. The screen support structure 29 includes a first support 39 that supports an opening edge of the screen 12 on a side close to the outflow port 6, and a second support 41 that supports an opening edge of the screen 12 on a side close to the inflow port 5, and a lower end of the first support body 39 serves as the upper coupling element 71. The lower coupling element 73 externally fitting and holding the lower end of the first support 39 when the lid 11 is attached to the access hole 7 protrudes from a bottom surface of the housing 10 facing the access hole 7. The upper discharge flow path 75 includes a first discharge flow path 77 communicating with an opening 37 of the screen 12 on the side close to the outflow port 6, and a second discharge flow path 78 provided inside the first support 39 and communicating with the first discharge flow path 77.

The screen support structure 29 includes the first support 39 fixed to the lid body 28 and supporting an opening edge of the screen 12 on the side close to the outflow port 6, a support shaft 40 extending from a midway portion of the first support 39 toward the side close to the inflow port 5, the second support 41 fixed to a side close to a free end of the support shaft 40 and supporting the opening edge of the screen 12 on the side close to the inflow port 5, a first coupling structure 42 coupling the first support 39 and the support shaft 40 to be attachable to and detachable from each other, and a second coupling structure 43 coupling the second support 41 and the support shaft 40 to be attachable to and detachable from each other. The screen 12 is sandwiched and held between the first support 39 and the second support 41.

The first support 39 includes a base end 45 extending from the lid body 28, a bottomed cylindrical screen receiver 46 provided below the base end 45, supporting the opening edge of the screen 12 on the side close to the outflow port 6, and closing the opening 37 on the side close to the outflow port 6, and a bottomless cylindrical free end 47 provided below the screen receiver 46. The base end 45, the screen receiver 46, and the free end 47 are integrally formed. The screen receiver 46 is provided with the first discharge flow path 77, and the free end 47 is provided with the second discharge flow path 78.

The second support 41 includes a frame-shaped receiving piece 52 having an opening 51 that allows the liquid to flow into the primary side of the screen 12 at a center of a board surface, and a lateral piece 53 that connects opposing frames of the receiving piece 52 so as to partition the opening 51. A regulating side 54 for preventing rotation is formed at an upper edge of the receiving piece 52, the regulating side 54 being received by an inner surface of the lid body 28.

The support shaft 40 is a stud bolt having external screws 60 and 61 at both ends. The first coupling structure 42 includes the external screw 60 provided on a first end of the stud bolt, a through-hole 62 provided in the screen receiver 46 to allow insertion of the external screw 60, and a nut 64 screwed with the external screw 60 protruding toward the outflow port 6 through the through-hole 62. The second coupling structure 43 includes the external screw 61 provided on a second end of the stud bolt and an internal screw 66 provided on the lateral piece 53 and screwed with the external screw 61.

The screen 12 has a bottomless cylindrical shape with a cylindrical inner surface as a primary side and a cylindrical outer surface as a secondary side. The lid 11 includes a lid body 28 that seals the access hole 7, and a screen support structure 29 that supports the screen 12 to be attachable and detachable. The screen support structure 29 includes a support column 110 that extends downward from the lid body 28, a first support 110 that is provided at a lower end of the support column 110 and supports an opening edge on the lower side of the screen 12, a second support 112 that is provided in a midway portion of the support column 110 and supports an opening edge on the upper side of the screen 12, and a coupling structure 113 that couples the support column 110 and the first support 111 to be attachable to and detachable from each other, and a lower end of the support column 110 serves as the upper coupling element 71. The lower coupling element 73 externally fitting and holding the lower end of the support column 110 when the lid 11 is attached to the access hole 7 protrudes from a bottom surface of the housing 10 facing the access hole 7. The upper discharge flow path 75 includes a first discharge flow path 131 communicating with the opening on the lower side of the screen 12 and a second discharge flow path 132 provided inside the support column 110 and communicating with the first discharge flow path 131. The screen 12 is sandwiched and held between the first support 111 and the second support 112.

The coupling structure 113 includes an external screw 128 provided at a distal end of the support column 110 and an internal screw 129 formed on an inner surface of the cylindrical first support 111.

A guide vane 90 for generating a swirling flow inside the screen 12 is formed upstream of the filter chamber 8.

The housing 10 defining the filter chamber 8 is provided with fluid supply paths 91 to 93 for pumping the fluid into the filter chamber 8 to generate a turbulent flow outside the screen 12 during the cleaning with use of the drain line 74.

Advantageous Effects of Invention

The inline-type strainer of the present invention includes the drain line 74 and the drain valve 84 that controls opening and closing of the drain line 74. In this configuration, by opening the drain line 74, the filtered residues adhering to the filter surface of the screen 12 can be discharged to the outside of the housing 10, and thus the filter surface can be reproduced by cleaning the screen 12 with the screen 12 installed inside the housing 10. Further, in the inline-type strainer of the present invention, the screen 12 is supported to be attachable to and detachable from the lid 11, and the screen 12 can be entirely taken out to the outside of the housing 10 through the access hole 7 when the lid 11 is removed from the housing 10. Thus, the filter surface can be reproduced by cleaning the screen 12 outside the housing 10. As described above, in the inline-type strainer of the present invention, two ways of cleaning can be performed, that is, the screen 12 can be cleaned through the drain line 74 and the screen 12 can be cleaned outside the housing 10. Thus, for example, the screen 12 is first cleaned through the drain line 74, and then when the screen 12 is not unclogged by the cleaning, the screen 12 is taken out to the outside of the housing 10 to be cleaned. Thus, the screen 12 can be optimally cleaned in accordance with usage and a clogging state. The screen 12 is cleaned through the drain line 74 daily, and the screen 12 is taken out to the outside of the housing 10 to be cleaned once in several months or weeks. In this case, the screen 12 can be cleaned optimally in accordance with the usage and the clogging state. Furthermore, the filter surface can be reproduced by taking out the screen 12 to the outside of the housing 10 and replacing the screen 12. As described above, since the screen 12 can be appropriately cleaned and replaced in accordance with the usage and the clogging state in the present invention, the inline-type strainer having an excellent function of reproducing the filter surface can be obtained.

In addition, in the present invention, the lid coupling mechanism 70 that couples the housing 10 and the lid 11 when the lid 11 is attached to the housing 10 is provided between the bottom surface of the housing 10 facing the filter chamber 8 and the lower end of the lid 11. The lower discharge flow path 76 is formed in the lower coupling element 73 on the side close to the housing 10 constituting the lid coupling mechanism 70, and the upper discharge flow path 75 is formed in the upper coupling element 71 on the side close to the lid 11 constituting the lid coupling mechanism 70. When the lid 11 is attached to the housing 10, the coupling state is established between the upper and lower coupling elements 71 and 73, the upper and lower discharge flow paths 75 and 76 communicate with each other, and thus the drain line 74 is constructed. When the lid 11 is removed from the housing 10, the coupling state between the upper and lower coupling elements 71 and 73 is released. In this configuration, the drain line 74 can be constructed only by attaching the lid 11 to the housing 10, and the drain line 74 can be disassembled only by removing the lid 11 from the housing 10 in a reverse procedure. Therefore, the present invention completely eliminates the need for constructing or disassembling the drain line 74 inside of the narrow housing 10, the drain line 74 can be constructed or disassembled easily and quickly with a single touch by simply attaching or detaching the lid 11 to or from the housing 10. Therefore, in the present invention, the inline-type strainer excellent in terms of assembly and maintenance can be obtained.

Since the access hole 7 is opened in the upper part of the housing 10, the liquid can be prevented from leaking from the housing 10 when the lid 11 is removed. Therefore, the liquid in the housing 10 need not be discharged every time the screen 12 is taken out, and the screen can be cleaned more quickly outside the housing 10.

Specifically, in a case where the upper coupling element 71 is formed at the lower end of the first support 39 supporting the opening edge of the screen 12 on the side close to the outflow port 6 in the screen support structure 29, the lower coupling element 73 externally fitting and holding the lower end of the first support 39 when the lid 11 is attached to the access hole 7 protrudes from the bottom surface of the housing 10 facing the access hole 7, and the upper discharge flow path 75 is constituted by the first discharge flow path 77 communicating with the opening 37 of the screen 12 on the side close to the outflow port 6 and the second discharge flow path 78 provided inside the first support 39 and communicating with the first discharge flow path 77, a fitted coupling state can be established between the upper and lower coupling elements 71 and 73 when the lid 11 is attached to the housing 10. Further, when the coupling state is established between the upper and lower coupling elements 71 and 73, the upper and lower discharge flow paths 77 and 78 communicate with each other, and the drain line 74 can be constructed. When the lid 11 is removed from the housing 10, the coupling state between the upper and lower coupling elements 71 and 73 is released, and thus the drain line 74 can be disassembled. As described above, the present invention completely eliminates the need for constructing or disassembling the drain line 74 in the narrow housing 10, and the drain line 74 can be constructed or disassembled quickly and easily. Thus, the inline-type strainer excellent in terms of assembly and maintenance can be obtained.

More specifically, the screen support structure 29 includes the first support 39 fixed to the lid body 28 and supporting an opening edge of the screen 12 on the side close to the outflow port 6, a support shaft 40 extending from a midway portion of the first support 39 toward the side close to the inflow port 5, the second support 41 fixed to a side close to a free end of the support shaft 40 and supporting the opening edge of the screen 12 on the side close to the inflow port 5, a first coupling structure 42 coupling the first support 39 and the support shaft 40 to be attachable to and detachable from each other, and a second coupling structure 43 coupling the second support 41 and the support shaft 40 to be attachable to and detachable from each other, and the screen 12 can be sandwiched and held between the first support 39 and the second support 41. In the screen support structure 29, only the first support 39 is fixed to the lid body 28, the second support 41 is held by the first support 39 via the support shaft 40, and the screen 12 is sandwiched and held between the first support 39 and the second support 41. Thus, by simply releasing the coupling state of the support shaft 40 to the first support 39 by the first coupling structure 42, the support shaft 40, the second support 41, and the screen 12 can be separated from the lid body 28 and the first support 39. In a reverse procedure, by establishing the coupling state of the support shaft 40 to the first support 39 by the first coupling structure 42, the support shaft 40, the second support 41, and the screen 12 can be coupled to the lid body 28 and the first support 39. Therefore, the screen 12 can be separated from the lid body 28 more quickly to be cleaned than, for example, in a configuration in which not only the first support 39 but also the second support 41 is fixed to the lid body 28, and thus the inline-type strainer excellent in terms of assembly and maintenance can be obtained.

In a case where the first support 39 includes the base end 45 extending from the lid body 28, the bottomed cylindrical screen receiver 46 formed below the base end 45, supporting the opening edge of the screen 12 on the side close to the outflow port 6, and closing the opening 37 on the side close to the outflow port 6, and the bottomless cylindrical free end 47 formed below the screen receiver 46, these three components including the base end 45, the screen receiver 46, and the free end 47 are integrally formed, the first support 39 has fewer components, and is structured more simply than in a case where the three components are configured separately. Furthermore, this configuration eliminates the need for assembling the three components, and can improve workability of assembly.

Since the second support 41 includes the frame-shaped receiving piece 52 provided with the opening 51 that allows the liquid to flow into the primary side of the screen 12 at the center of the board surface and the lateral piece 53 that connects the opposing frames of the receiving pieces 52 so as to partition the opening 51, the opening edge of the screen 12 on the side close to the inflow port 5 can be supported in the entire circumference by the frame-shaped receiving piece 52, and deformation of the screen 12 can be effectively prevented. Further, since the receiving piece 52 has a frame shape provided with the opening 51, the shape minimizes hindrance of inflow of the liquid into the primary side of the screen 12 by providing the receiving piece 52, and the liquid can flow into the screen 12 without any trouble. In a case where the regulating side 54 received by the inner surface of the lid body 28 is formed at the upper edge of the receiving piece 52, the second support 41 can be prevented from rattling by receiving the fluid pressure. Thus, the first coupling structure 42 and the second coupling structure 43 can be prevented from being inadvertently released, and the screen 12 can be prevented from falling off from the screen support structure 29. The second support 41 can be prevented from rattling, and can be thus more silent.

In a case where the support shaft 40 is a stud bolt having the external screws 60 and 61 at both ends, and the first coupling structure 42 includes the external screw 60 provided at the first end of the stud bolt 40, the through-hole 62 provided in the screen receiver 46 and allowing insertion of the external screw 60, and the nut 64 into which the external screw 60 is screwed, the external screw 60 protruding toward the outflow port 6 through the through-hole 62, and the second coupling structure 43 includes the external screw 61 provided at the second end of the stud bolt, and the internal screw 66 provided in the lateral piece 53 and screwed with the external screw 61, the first coupling structure 42 and the second coupling structure 43 can be simplified, and thus a manufacturing cost of the inline-type strainer can be suppressed.

The screen support structure 29 of the present invention can include the support column 110 extending downward from the lid body 28, the first support 111 provided at the lower end of the support column 110 and supporting the opening edge on the lower side of the screen 12, the second support 112 provided at the midway portion of the support column 110 and supporting the opening edge on an upper side of the screen 12, and the coupling structure 113 coupling the support column 110 and the first support 111 to be attachable to and detachable from each other, the lower end of the support column 110 serving as the upper coupling element 71, the lower coupling element 73 externally fitting and holding the lower end of the support column 110 when the lid 11 is attached to the access hole 7 can protrude from the bottom surface of the housing 10, the bottom surface facing the access hole 7, and the upper discharge flow path 75 can include the first discharge flow path 131 communicating with the opening on the lower side of the screen 12 and the second discharge flow path 132 provided inside the support column 110 and communicating with the first discharge flow path 131. This configuration can establish the fitted coupling state between the upper and lower coupling elements 71 and 73 when the lid 11 is attached to the housing 10. Further, when the coupling state is established between the upper and lower coupling elements 71 and 73, the upper and lower discharge flow paths 131 and 132 communicate with each other, and the drain line 74 can be constructed. When the lid 11 is removed from the housing 10, the coupling state between the upper and lower coupling elements 71 and 73 is released, and thus the drain line 74 can be disassembled. As described above, the present invention completely eliminates the need for constructing or disassembling the drain line 74 in the narrow housing 10, and the drain line 74 can be constructed or disassembled quickly and easily. Thus, the inline-type strainer excellent in terms of assembly and maintenance can be obtained.

In the screen support structure 29 of the present invention, only the support column 110 is fixed to the lid body 28, and the screen 12 is sandwiched and held between the first support 111 and the second support 112. Thus, by simply releasing the coupling state of the first support 111 to the support column 110 by the coupling structure 113, the first support 111, the second support 112, and the screen 12 can be separated from the lid body 28 and the support column 110. In a reverse procedure, by establishing the coupling state of the first support 111 to the support column 110 by the coupling structure 113, the first support 111, the second support 112, and the screen 12 can be coupled to the lid body 28 and the support column 110. Therefore, the screen 12 can be easily separated from the lid body 28 to be cleaned, and an inline-type strainer excellent in terms of assembly and maintenance can be obtained.

The coupling structure 113 including the external screw 128 provided at a distal end of the support column 110 and the internal screw 129 formed on the inner surface of the cylindrical first support 111 can simplify the coupling structure 113, and suppress the manufacturing cost of the inline-type strainer.

In a case where the guide vane 90 for generating the swirling flow is formed in the screen 12 upstream of the filter chamber 8, the foreign matters stuck inside the screen 12 can be peeled off by the fluid pressure of the swirling flow, and thus the filter surface of the screen 12 can be more efficiently reproduced when the drain line 74 is opened.

In a case where the housing 10 defining the filter chamber 8 is provided with fluid supply paths 91 to 93 for pumping a fluid into the filter chamber 8 to generate a turbulent flow outside the screen 12 during the cleaning with use of the drain line 74, the solid foreign matters and the like adhering to the cylindrical inner surface of the screen 12 can be lifted from the cylindrical inner surface. Thus, the solid foreign matters and the like can be more reliably peeled off from the cylindrical inner surface, and the solid foreign matters and the like can be discharged to the outside of the housing 10 through the drain line 74 to reproduce the filter surface.

BRIEF DESCRIPTION OF DRAWINGS

FIG. 2 is an exploded front view of a main part of the inline-type strainer, illustrating a state in which a lid is removed from a housing.

FIG. 3 is a longitudinal sectional front view of a main part of the inline-type strainer.

FIG. 4 is an exploded perspective view of a screen support structure.

FIG. 5 is a sectional view taken along line A-A in FIG. 1.

FIG. 6 is a plan view of the housing.

DESCRIPTION OF EMBODIMENTS (First embodiment) FIGS. 1 to 6 illustrate a first embodiment in which an inline-type strainer of the present invention is applied to a straight strainer having a linear internal flow path. Front and rear, left and right, and up and down in the present embodiment are in accordance with cross arrows indicated in FIGS. 1, 3, and 5 and front and rear, left and right, and up and down indicated near each arrow. As illustrated in FIG. 1, a strainer 1 according to the present embodiment is disposed between a first transfer pipe 2 located upstream and a second transfer pipe 3 located downstream, and filters a liquid flowing in a line constituted by the transfer pipes 2 and 3 to remove solid foreign matters and the like as filtered residues. The strainer 1 includes a housing 10 including an inflow port 5 opened at a left end, an outflow port 6 opened at a right end, and an access hole 7 opened in an upper part, and includes a filter chamber 8 extending from the inflow port 5 toward the outflow port 6 inside, a lid 11 configured to be attachable to and detachable from the housing 10, a screen 12 disposed in the filter chamber 8, an inflow cylinder 13 provided on a left side of the housing 10, an outflow cylinder 14 provided on a right side of the housing 10, and the like. The housing 10, the inflow cylinder 13, and the outflow cylinder 14 are constituted as an integrally formed cast product.

Figure 1:
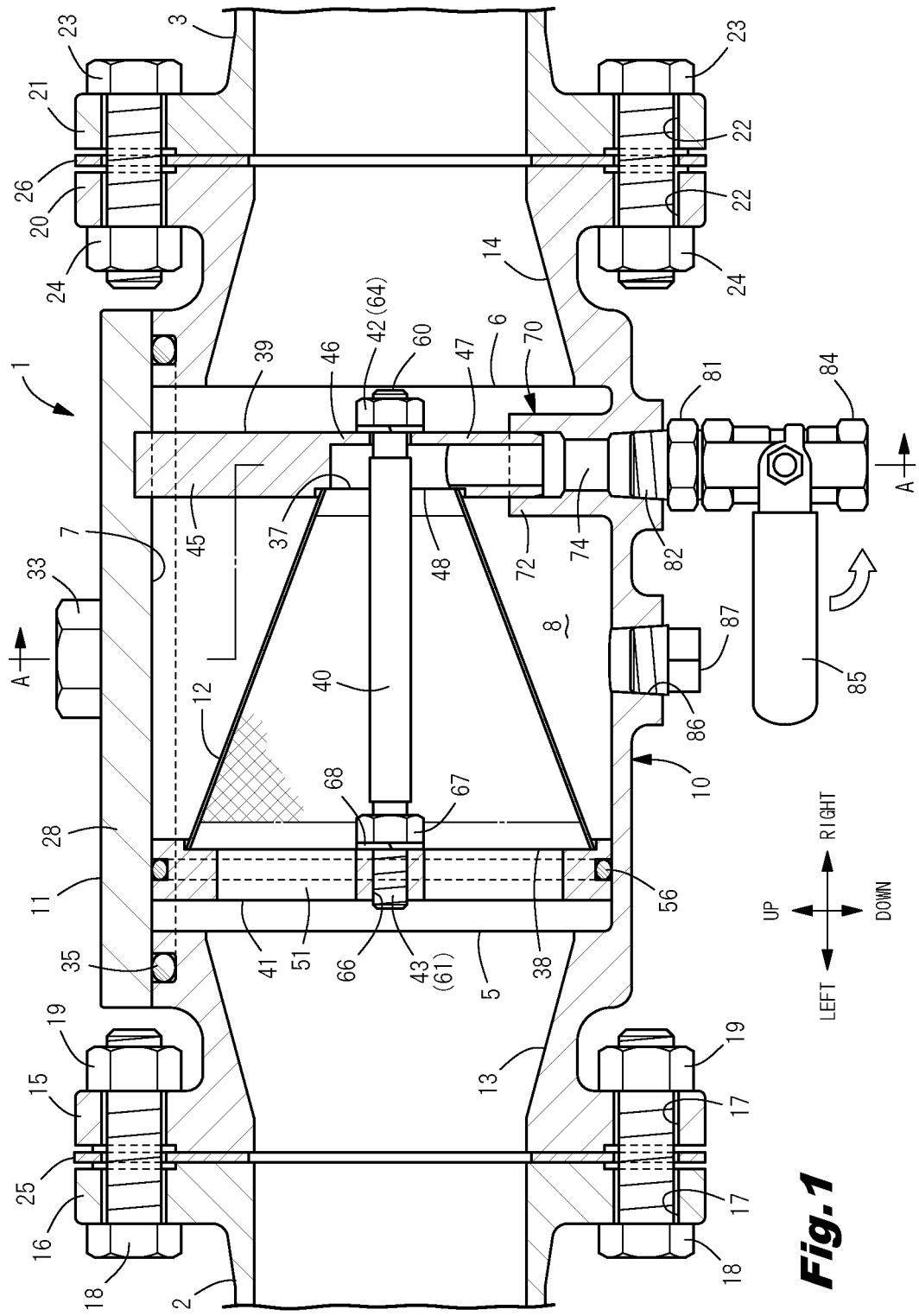
FIG. 1 is a longitudinal front view of an inline-type strainer according to a first embodiment of the present invention.

Flanges 15 and 16 are provided at a left end of the inflow cylinder 13 and at a right end of the first transfer pipe 2, respectively. The flanges 15 and 16 of the inflow cylinder 13 and the first transfer pipe 2 are abutted with each other, a bolt 18 is passed through a plurality of bolt holes 17 provided in the flanges 15 and 16, and then the flanges 15 and 16 are fastened with a nut 19. The inflow cylinder 13 and the first transfer pipe 2 are thus coupled to each other. Similarly, flanges 20 and 21 are provided at a right end of the outflow cylinder 14 and a left end of the second transfer pipe 3, respectively. The flanges 20 and 21 of the outflow cylinder 14 and second transfer pipe 3 are abutted with each other, a bolt 23 is passed through bolt holes 22 provided in the flanges 20 and 21, and then the flanges 20 and 21 are fastened by a nut 24. The outflow cylinder 14 and the second transfer pipe 3 are thus coupled to each other. A coupled portion between the inflow cylinder 13 and the first transfer pipe 2 is sealed with a ring-shaped packing 25. Similarly, a coupled portion between the outflow cylinder 14 and the second transfer pipe 3 is sealed with a ring-shaped packing 26. An axial direction of the inflow cylinder 13 and the outflow cylinder 14 is oriented in a left-right horizontal direction.

As illustrated in FIG. 5, an inner surface of the housing 10 has a U-shaped cross section, and the access hole 7 is opened at an upper end of the housing 10. The access hole 7 is formed mainly for taking out the screen 12 from the filter chamber 8 and cleaning the inside of the filter chamber 8, and has a substantially square shape in plan view (see FIG. 6). As illustrated in FIG. 2, the lid 11 detachably attached to the access hole 7 includes a lid body 28 that seals the access hole 7 and a screen support structure 29 that supports the screen 12 to be attachable and detachable. As illustrated in FIGS. 5 and 6, attachment pieces 30 and 31 are formed to protrude from front and rear ends of the lid 11 and the housing 10, respectively. The attachment pieces 30 and 31 of the lid 11 and the housing 10 are aligned, and then a bolt 33 is screwed into a screw hole 34 provided in the attachment piece 30 in the housing 10 side through a bolt hole 32 provided in the attachment piece 31 in the lid 11 side. Thus, the lid 11 can be fixed and attached to the housing 10. In FIG. 5, a reference sign 35 denotes a water shut-off packing attached to the inside of the recessed groove 36 formed in an opening peripheral edge of the access hole 7 of the housing 10. The water shut-off packing 35 seals a gap between a lower surface of the lid 11 and an upper surface of the housing 10 during fixing and attaching.

As shown in FIG. 4, the screen 12 includes a stainless steel mesh having a large number of microholes, as a material, has a small diameter portion on a side close to the outflow port 6 (right side) of the housing 10 and a large diameter portion on a side close to the inflow port 5 (left side) of the housing 10, and has a bottomless tapered cylindrical shape having openings 37 and 38 at both ends. The liquid flowing into the filter chamber 8 from the inflow port 5 passes through the screen 12 and is discharged from the outflow port 6. At this time, a cylindrical inner surface of the screen 12 is a primary side of filtration, a cylindrical outer surface is a secondary side of filtration, and solid foreign matters and the like are caught on the cylindrical inner surface. Further, solid foreign matters or the like deposited on the primary side of the screen 12 can be discharged to outside of the housing 10 through a drain line 74 described later.

In FIGS. 1 to 4, the screen support structure 29 includes a first support 39 fixed to the lid body 28 and supporting an opening edge of the screen 12 on the side close to the outflow port 6 (right side), a support shaft 40 extending from a midway portion of the first support 39 toward the side close to the inflow port 5 (left side) and penetrates an axis of the screen 12, a second support 41 fixed to a side close to a free end of the support shaft 40 and supporting the opening edge of the screen 12 on the side close to the inflow port 5 (left side), a first coupling structure 42 coupling the first support 39 and the support shaft 40 to be attachable to and detachable from each other, and a second coupling structure 43 coupling the second support 41 and the support shaft 40 to be attachable to and detachable from each other.

The first support 39 integrally includes a columnar base end 45 extending downward from the lid body 28, a screen receiver 46 continuously provided below the base end 45, supporting a small-diameter opening edge of the screen 12 on the side close to the outflow port 6 (right side), and closing the opening 37 on the side close to the outflow port 6 (right side), and a bottomless cylindrical free end 47 continuously provided below the screen receiver 46. An upper end of the base end 45 is fixed to a lower surface of the lid body 28. The screen receiver 46 has a bottomed cylindrical shape having an opening 48 on the left side, and a receiving surface 49 directed leftward and receiving the opening edge of the screen 12 on the side close to the outflow port 6 is formed on a peripheral edge of the opening 48.

The second support 41 has a U shape to be fitted to an inner peripheral surface of the housing 10 having a U-shaped cross section, and includes a frame-shaped receiving piece 52 having a circular opening 51 that allows the liquid to flow into the primary side of the screen 12 at a center of a board surface, and a lateral piece 53 that connects opposing frames of the receiving piece 52 so as to partition the opening 51. The upper edge of the receiving piece 52 is received by an inner surface of the lid 11 to serve as a regulating side 54 that prevents inadvertent rotation. A receiving surface 55 directed rightward is formed on an inner peripheral edge of the opening 51 on a side close to the screen 12, and the opening edge of the screen 12 on the side close to the inflow port 5 is received by the receiving surface 55. In FIG. 2, a reference sign 56 denotes a water shut-off packing attached to the inside of a recessed groove 57 formed on an entire circumference of the receiving piece 52, and the water shut-off packing 56 seals a gap between inner surfaces of the housing 10 and the lid body 28 and the second support 41 when the screen 12 is attached.

The support shaft 40 is a stud bolt having external screws 60 and 61 at left and right ends. The first coupling structure 42 includes the external screw 60 provided at a right end of the support shaft 40, a through-hole 62 provided at a center of the cylindrical end surface of the screen receiver 46 to allow insertion of the external screw 60, a washer 63 attached to the external screw 60 protruding toward the outflow port 6 through the through-hole 62, and a nut 64 into which the external screw 60 is screwed (see FIG. 3). The second coupling structure 43 includes the external screw 61 provided at a left end of the support shaft 40, an internal screw 66 screwed with the external screw 61 provided at a central of the lateral piece 53, a nut 67 for preventing rotation to which the external screw 61 is screwed and attached, and a washer 68 (see FIG. 1).

In the screen support structure 29 configured as described above, for example, after the support shaft 40 is coupled to the second support 41 by the second coupling structure 43, the support shaft 40 is inserted into the screen 12 from the opening 38 of the screen 12 on the side close to the inflow port 5 (left side), the support shaft 40 protruding from the opening 37 of the screen 12 on the side close to the outflow port 6 (right side) is passed through the through-hole 62 of the screen receiver 46 of the first support 39, and the support shaft 40 and the first support 39 are coupled by the first coupling structure 42. Thus, the screen 12 can be fixed to the lid 11 with the screen 12 sandwiched and held between the first support 39 and the second support 41. By loosening the nut 64 of the first coupling structure 42 to release a coupling state between the support shaft 40 and the first support body 39, and then pulling out the support shaft 40 from inside of the screen 12, the screen 12 can be separated from the lid 11.

A lid coupling mechanism 70 for coupling the housing 10 and the lid 11 when the lid 11 is attached to the housing is provided between the housing 10 and the lid 11. As illustrated in FIG. 3, in the lid coupling mechanism 70 according to the present embodiment, a lower end of the first support 39 is an upper coupling element 71, and a boss 72 protruding from a bottom surface of the housing 10 and externally fitting and holding the upper coupling element 71 is a lower coupling element 73. That is, the lid coupling mechanism 70 according to the present embodiment includes the upper coupling element 71 as a lower end of the free end 47 of the first support 39 and the lower coupling element 73 including the boss 72 protruding from the bottom surface of the housing 10.

Inside the lid coupling mechanism 70, the drain line 74 for discharging solid foreign matters or the like deposited on the primary side of the screen 12 to the outside of the housing 10 is provided. The drain line 74 includes an upper discharge flow path 75 formed in the upper coupling element 71 and a lower discharge flow path 76 formed in the lower coupling element 73 and reaching the outside of the housing 10. The upper discharge flow path 75 includes a first discharge flow path 77 provided in the screen receiver 46 of the first support 39 and communicating with the opening 37 of the screen 12 on the side closer to the outflow port 6 (right side), and a second discharge flow path 78 provided in the free end 47 of the first support 39 and communicating with the first discharge flow path 77. As described above, when the lid 11 is attached to the housing 10, a coupling state is established between the upper and lower coupling elements 71 and 73 by the lid coupling mechanism 70, and the upper and lower discharge flow paths 75 and 76 communicate with each other, and thus the drain line 74 from the opening 37 of the screen 12 to the outside of the housing 10 is constructed. Further, when the lid 11 is removed from the housing 10, the coupling state between the upper and lower coupling elements 71 and 73 is released, a communication state between the upper and lower discharge flow paths 75 and 76 is released, and the drain line 74 is disassembled.

As illustrated in FIG. 2, an attachment portion 80 that allows entry of a lower end of the free end 47 of the first support 39 is formed at an upper end of the boss 72, and an internal screw 83 with which an external screw 82 of a connection nipple 81 is screwed is formed at a lower end of a discharge port of the housing 10 communicating with the boss 72. A drain valve 84 controlling opening and closing of the drain line 74 is coupled to the connection nipple 81 (see FIG. 1). The drain valve 84 can be controlled to open and close by manually rotating a handle 85. When the handle 85 is in a horizontal orientation, the drain valve 84 is in a closed state to close the drain line 74. When the handle 85 is rotated downward by 90 degrees from the horizontal posture, the drain valve 84 can be in an open state to open the drain line 74. By opening the drain line 74 in this manner, a part of the liquid received from the opening 38 of the screen 12 on the side closer to the inflow port 5 (left side) can be sent out to the outside of the housing 10 through the drain line 74 including the upper discharge flow path 75 and the lower discharge flow path 76. At this time, the solid foreign matters and the like adhering to the primary side (filter surface) of the screen 12 can be discharged from the drain line 74 to the outside of the housing 10 together with the liquid to clean the screen 12. At this time, by arranging a bucket or the like below the drain valve 84 in advance, the solid foreign matters or the like discharged from the drain line 74 can be received by the bucket or the like.

In FIGS. 1 and 2, a reference sign 86 denotes a fluid discharge hole for discharging the liquid existing in the filter chamber 8, and a reference sign 87 denotes a cap configured to be attachable and detachable so as to close the fluid discharge hole 86. The fluid discharge hole 86 is opened when the filter chamber 8 is cleaned, for example.

As described above, since the strainer 1 according to the present embodiment includes the drain line 74 for discharging the solid foreign matters or the like deposited on the primary side of the screen 12 to outside of the housing 10, the filter surface can be reproduced by cleaning in a state where the screen 12 is installed in the housing 10. Further, in the strainer 1 according to the present embodiment, the screen 12 is supported to be attachable to and detachable from the lid 11, and the screen 12 can be entirely taken out to the outside of the housing 10 through the access hole 7 when the lid 11 is removed from the housing 10. Thus, the filter surface can be reproduced by cleaning the screen 12 outside the housing 10. As described above, in the strainer 1 according to the present embodiment, two ways of cleaning can be performed, that is, the screen 12 can be cleaned through the drain line 74 and the screen 12 can be cleaned outside the housing 10. Thus, for example, the screen 12 is first cleaned through the drain line 74, and then when the screen 12 is not unclogged by the cleaning, the screen 12 is taken out to the outside of the housing 10 to be cleaned. Thus, the screen 12 can be optimally cleaned in accordance with usage and a clogging state. The screen 12 is cleaned through the drain line 74 daily, and the screen 12 is taken out to the outside of the housing 10 to be cleaned once in several months or weeks. In this case, the screen 12 can be cleaned optimally in accordance with the usage and the clogging state. Furthermore, the filter surface can be reproduced by taking out the screen 12 to the outside of the housing 10 and replacing the screen 12. As described above, since the screen 12 can be appropriately cleaned and replaced in accordance with the usage and the clogging state, the strainer 1 having an excellent function of reproducing the filter surface can be obtained.

In addition, as described above, in the strainer 1 according to the present embodiment, the lid coupling mechanism 70 that couples the housing 10 and the lid 11 when the lid 11 is attached to the housing 10 is provided between the bottom surface of the housing 10 facing the filter chamber 8 and the lower end of the lid 11. The lower discharge flow path 76 is formed in the lower coupling element 73 on the side close to the housing 10 constituting the lid coupling mechanism 70, and the upper discharge flow path 75 is formed in the upper coupling element 71 on the side close to the lid 11 constituting the lid coupling mechanism 70. When the lid 11 is attached to the housing 10, the coupling state is established between the upper and lower coupling elements 71 and 73, the upper and lower discharge flow paths 75 and 76 communicate with each other, and thus the drain line 74 is constructed. When the lid 11 is removed from the housing 10, the coupling state between the upper and lower coupling elements 71 and 73 is released. In this configuration, the drain line 74 can be constructed only by attaching the lid 11 to the housing 10, and the drain line 74 can be disassembled only by removing the lid 11 from the housing 10 in a reverse procedure. Therefore, the strainer 1 according to the present embodiment completely eliminates the need for constructing or disassembling the drain line 74 inside of the narrow housing 10, the drain line 74 can be constructed or disassembled easily and quickly with a single touch by simply attaching or detaching the lid 11 to or from the housing 10, and the strainer excellent in terms of assembly and maintenance can be obtained.

Further, since the access hole 7 is opened in the upper part of the housing 10, the liquid does not leak from the housing 10 when the lid 11 is removed. Therefore, the liquid in the housing 10 need not be discharged every time the screen 12 is taken out, and the screen can be cleaned more quickly outside the housing 10.

As described above, only the first support 39 is fixed to the lid body 28, and the second support 41 is merely held by the first support 39 via the support shaft 40. Thus, the support shaft 40, the second support 41, and the screen 12 can be separated from the lid body 28 and the first support 39 only by releasing the coupling state of the support shaft 40 to the first support 39 by the first coupling structure 42. In a reverse procedure, the support shaft 40, the second support 41, and the screen 12 can be coupled to the lid body 28 and the first support 39 by establishing the coupling state of the support shaft 40 to the first support 39 by the first coupling structure 42. In this configuration, the screen 12 can be separated from the lid body 28 more quickly to be cleaned than, for example, in a configuration in which not only the first support 39 but also the second support 41 are fixed to the lid body 28, and thus excellent properties in terms of assembly and maintenance can be secured.

The first support 39 is configured by integrally forming three components including the base end 45, the screen receiver 46, and the free end 47, has fewer components, and is structured more simply than in a case where the three components are configured separately. Furthermore, this configuration eliminates the need for assembling the three components, and can improve workability of assembly.

Since the second support 41 includes the frame-shaped receiving piece 52 provided with the opening 51 that allows the liquid to flow into the primary side of the screen 12 at the center of the board surface and the lateral piece 53 that connects the opposing frames of the receiving pieces 52 so as to partition the opening 51, the opening edge of the screen 12 on the side close to the inflow port 5 (left side) can be supported in the entire circumference by the receiving piece 52, and deformation of the screen 12 can be effectively prevented. Further, since the receiving piece 52 has a frame shape provided with the opening 51, the liquid can be prevented from being hindered from flowing into the primary side of the screen 12 by providing the receiving piece 52, and the liquid can flow into the screen 12 without any trouble. The regulating side 54 received by the inner surface of the lid body 28 is formed at the upper edge of the receiving piece 52, and this can prevent the second support 41 from rattling by receiving a fluid pressure. It is therefore possible to effectively prevent the screen 12 from falling off the screen support structure 29 due to inadvertent release of the first coupling structure 42 and the second coupling structure 43. The second support 41 can be prevented from rattling, and can be thus more silent.

The support shaft 40 is formed as a stud bolt having the external screws 60 and 61 at both ends, and the coupling structures (first and second coupling structures) 42 and 43 are formed as screw structures including the nuts 64 and 67. Thus, the first coupling structure 42 and the second coupling structure 43 can be simplified, and a manufacturing cost of the strainer 1 can be suppressed.

Figure 7:
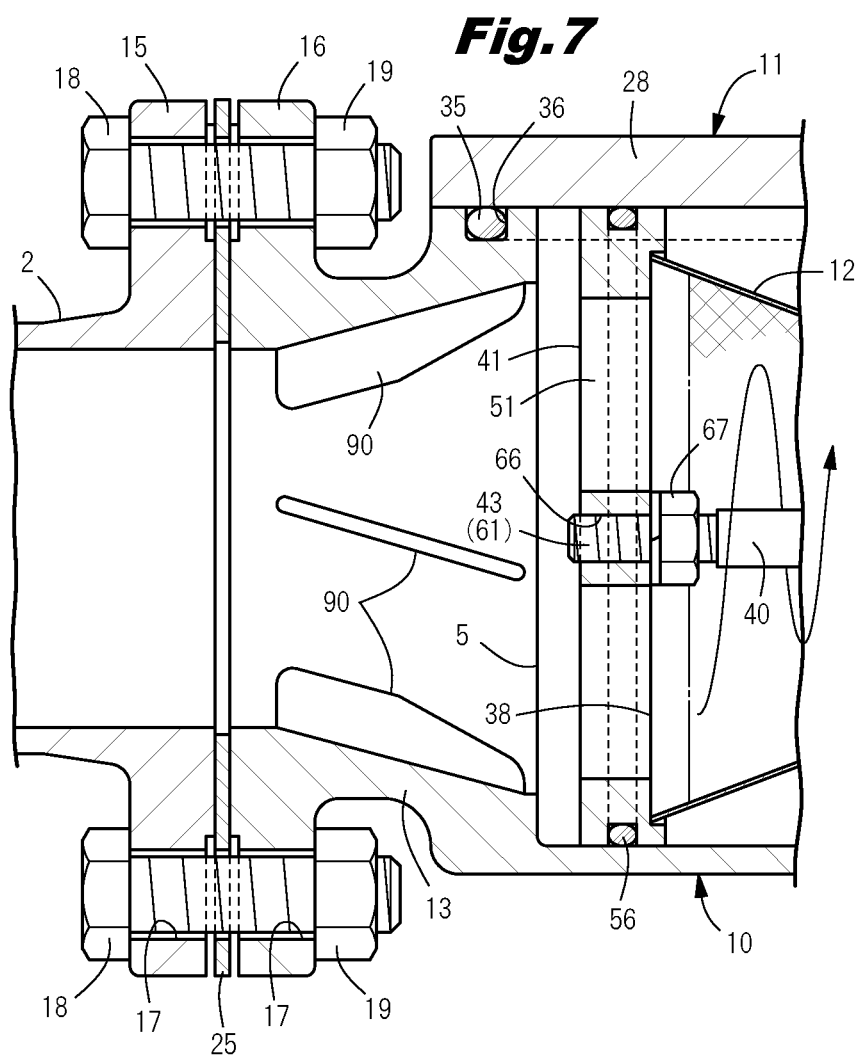
FIG. 7 is a longitudinal sectional front view of a main part of an inline-type strainer according to a second embodiment of the present invention.

(Second embodiment) FIG. 7 illustrates a second embodiment of the inline-type strainer of the present invention. The strainer according to the second embodiment is different from the strainer according to the first embodiment described above in that guide vanes 90 for generating a swirling flow inside the screen 12 are provided on an inner surface of the inflow cylinder 13. Specifically, the guide vanes 90 are formed at four positions of upper, lower, front, and rear positions on the inner surface of the inflow cylinder 13, and a rotating force is applied to the liquid by passing through the guide vanes 90 to generate a counterclockwise swirling flow inside the screen 12. The other points are similar to those of the first embodiment, and thus the same members are denoted by the same reference signs, and the description thereof will be omitted.

In the strainer 1 according to the second embodiment, the foreign matters stuck inside the screen 12 can be peeled off by a fluid pressure of the swirling flow, and thus the filter surface of the screen 12 can be more efficiently reproduced when the drain line 74 is opened.

Figure 8:
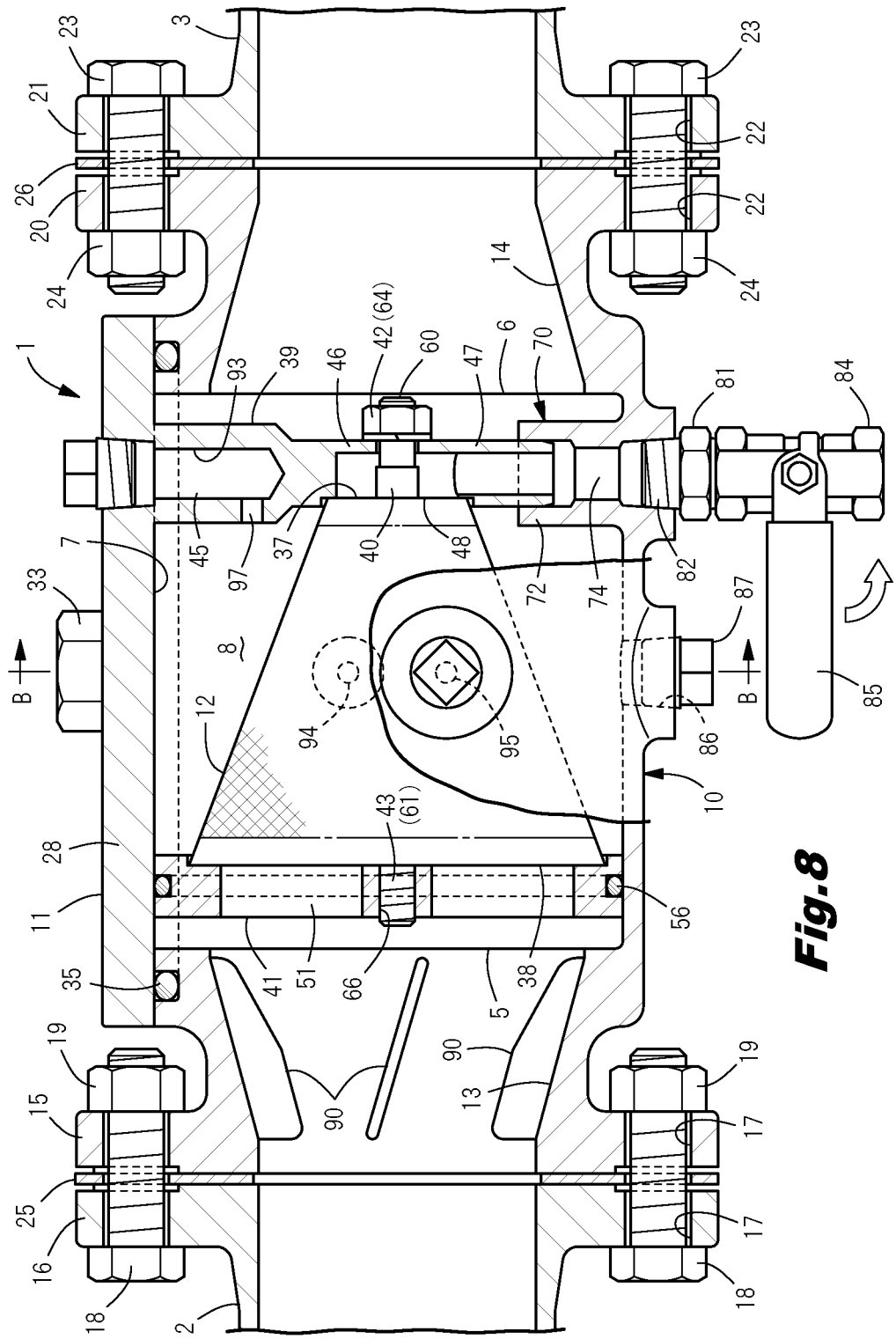
FIG. 8 is a longitudinal front view of an inline-type strainer according to a third embodiment of the present invention.
Figure 9:
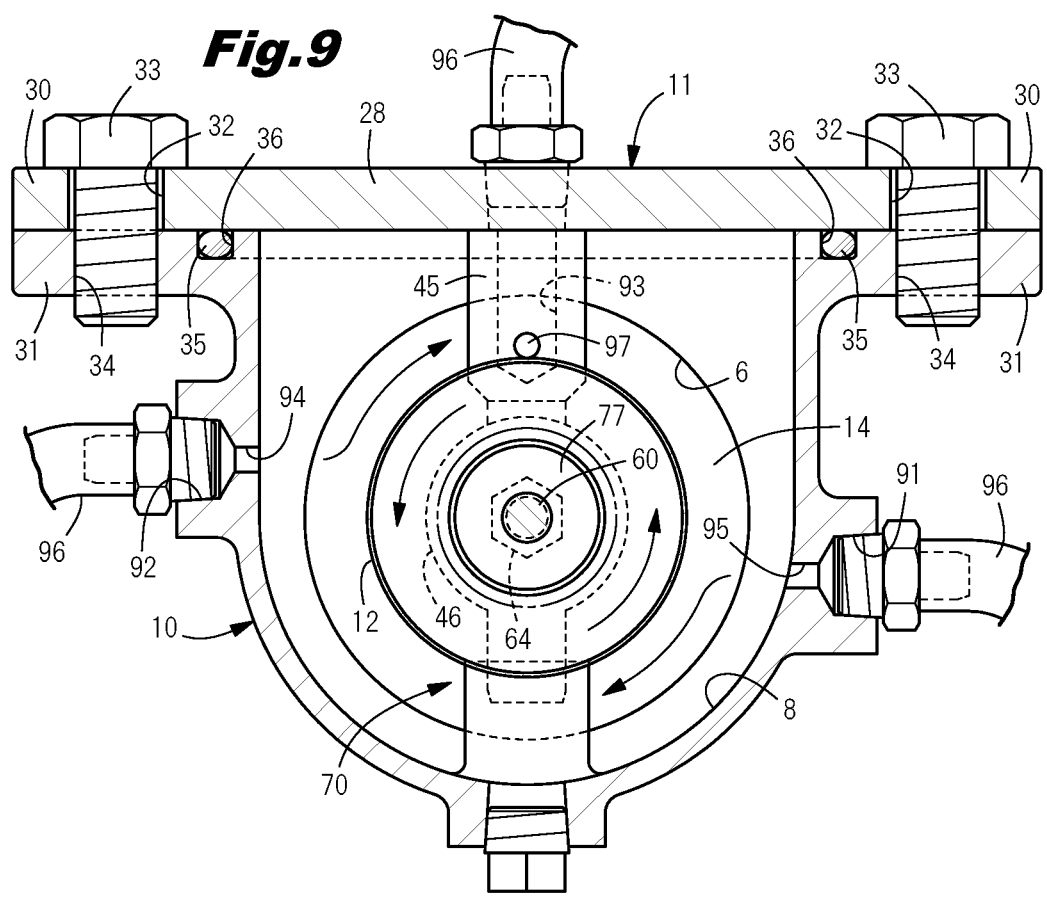
FIG. 9 is a sectional view taken along line B-B in FIG. 8.
Figure 10:
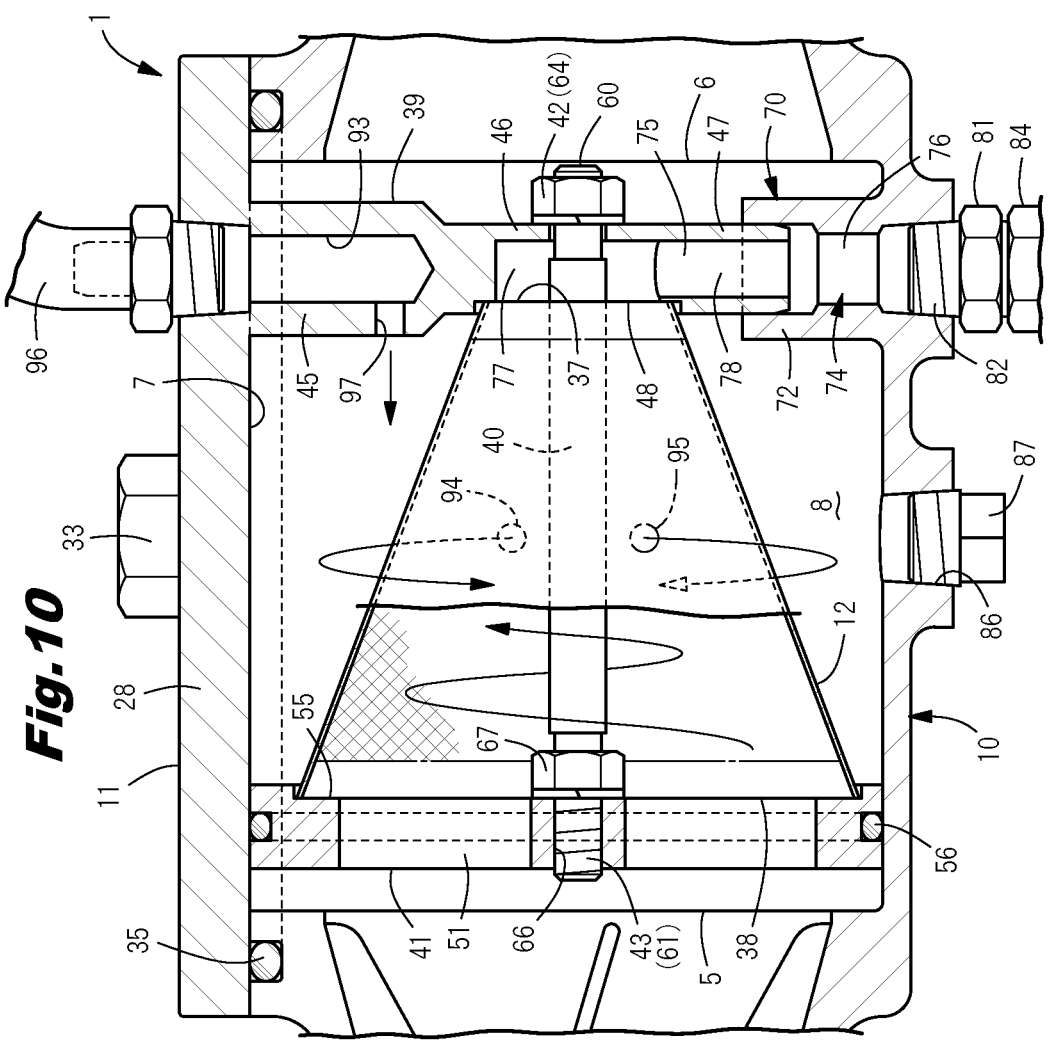
FIG. 10 is a longitudinal front view of the inline-type strainer, illustrating a direction of a swirling flow.

(Third embodiment) FIGS. 8 to 10 illustrate a third embodiment of the inline-type strainer of the present invention. The strainer according to the third embodiment is different from the strainer according to the second embodiment described above in that the housing 10 defining the filter chamber 8 is provided with fluid supply paths 91 to 93 for pumping a fluid into the filter chamber 8 to generate a turbulent flow outside the screen 12 during the cleaning with use of the drain line 74. Specific examples of the fluid pumped from the fluid supply paths 91 to 93 into the filter chamber 8 include liquid (water), gas (air), and water vapor.

Specifically, the first supply path 91 is formed on a front surface of the housing 10 defining the filter chamber 8, the second supply path 92 is formed on a rear surface of the housing 10 defining the filter chamber 8, and the third supply path 93 is formed at the base end 45 constituting the first support 39 of the support structure 29 of the screen 12. As illustrated in FIGS. 9 and 10, a supply port 94 of the second supply path 92 facing the filter chamber 8 is provided above a supply port 95 of the first supply path 91. When hoses 96 and 96 are coupled to the supply paths 91 and 92 to pump the fluid into the filter chamber 8 through the supply ports 94 and 95, a clockwise swirling flow in a direction opposite to the counterclockwise swirling flow generated by the guide vanes 90 is generated outside the screen 12. A supply port 97 of the third supply path 93 facing the filter chamber 8 is directed upstream (left side), and when the hose 96 is coupled to the third supply path 93 and the fluid is pumped into the filter chamber 8 through the third supply path 93, an injection flow in a direction from downstream to upstream is generated outside the screen 12.

As described above, when the fluid supplied from the first and second supply paths 91 and 92 forms, outside of the screen 12, the swirling flow in the direction opposite to the swirling flow generated by the guide vanes 90, the solid foreign matters and the like adhering to the cylindrical inner surface of the screen 12 can be lifted from the cylindrical inner surface. Thus, the solid foreign matters and the like can be more reliably peeled off from the cylindrical inner surface, and the solid foreign matters and the like can be discharged to the outside of the housing 10 through the drain line 74 to reproduce the filter surface. Further, when the fluid supplied from the third supply path 93 forms the injection flow in a direction from downstream to upstream outside of the screen 12, the solid foreign matters and the like adhering to the primary side (cylindrical inner surface) of the screen 12 can be lifted from the cylindrical inner surface. Thus, the solid foreign matters and the like can be more reliably peeled off from the cylindrical inner surface, and the solid foreign matters and the like can be discharged to the outside of the housing 10 through the drain line 74 to reproduce the filter surface. The supply of the fluid from the first and second supply paths 91 and 92 and the supply of the fluid from the third supply path 93 may be performed separately or simultaneously.

Figure 11:
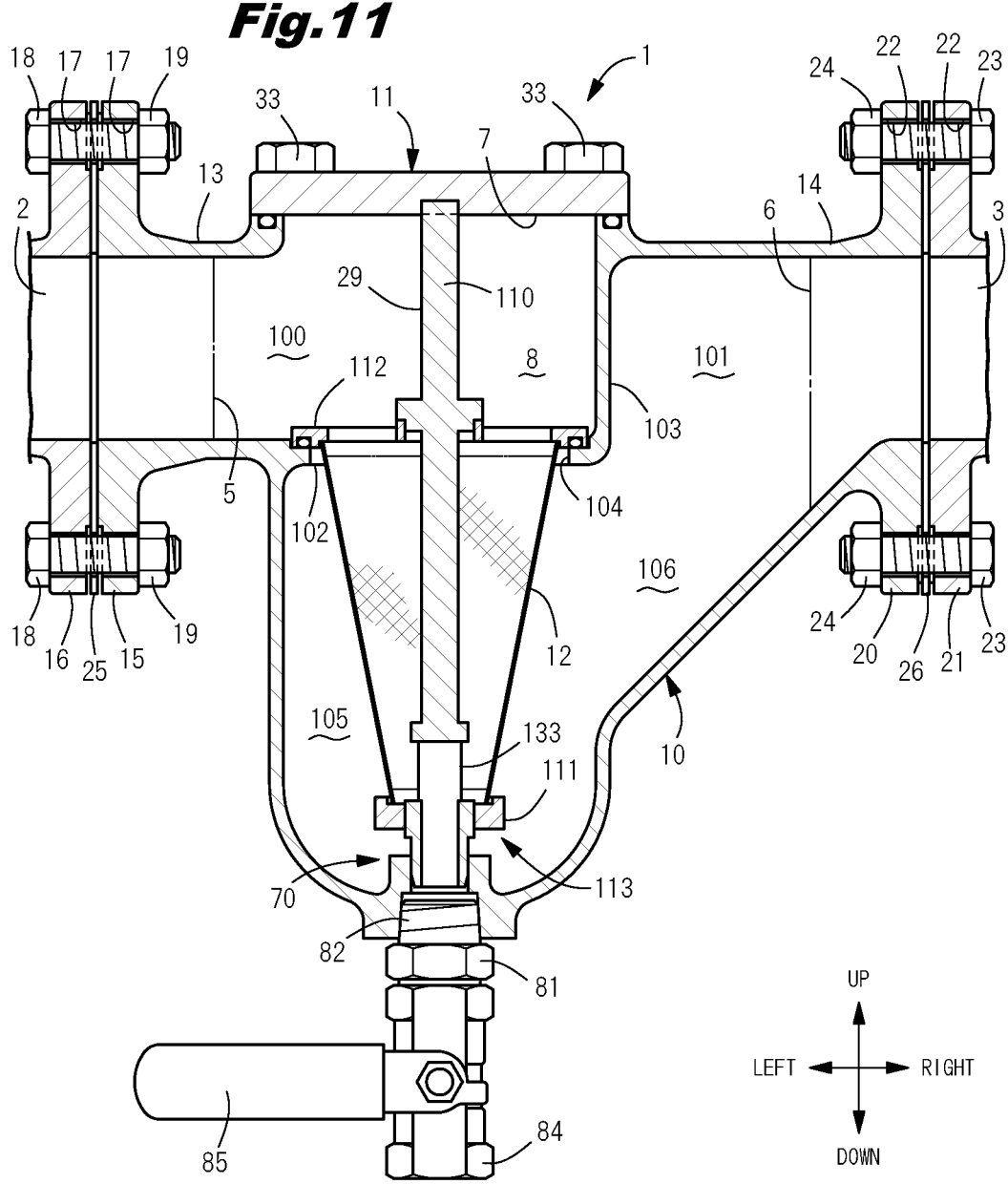
FIG. 11 is a longitudinal front view of an inline-type strainer according to a fourth embodiment of the present invention.

(Fourth embodiment) FIGS. 11 to 17 illustrate a fourth embodiment in which the inline-type strainer of the present invention is applied to a U-shaped strainer 1 having a meandering internal flow path. Front and rear, left and right, and up and down in the present embodiment are in accordance with cross arrows indicated in FIGS. 11, 12, and 17 and front and rear, left and right, and up and down indicated near each arrow. As illustrated in FIG. 11, the strainer 1 according to the present embodiment is disposed between a first transfer pipe 2 located upstream and a second transfer pipe 3 located downstream, and filters a liquid flowing in a line constituted by the transfer pipes 2 and 3 to remove solid foreign matters and the like. The strainer 1 includes a housing 10 including an inflow port 5 opened at a left end, an outflow port 6 opened at a right end, and an access hole 7 opened in an upper part, and includes a filter chamber 8 extending from the inflow port 5 toward the outflow port 6 inside, a lid 11 configured to be attachable to and detachable from the housing 10, a screen 12 disposed in the filter chamber 8, an inflow cylinder 13 provided on a left side of the housing 10, an outflow cylinder 14 provided on a right side of the housing 10, and the like. The housing 10, the inflow cylinder 13, and the outflow cylinder 14 are constituted as an integrally formed cast product.

Flanges 15 and 16 are provided at a left end of the inflow cylinder 13 and at a right end of the first transfer pipe 2, respectively. The flanges 15 and 16 of the inflow cylinder 13 and the first transfer pipe 2 are abutted with each other, a bolt 18 is passed through a plurality of bolt holes 17 provided in the flanges 15 and 16, and then the flanges 15 and 16 are fastened with a nut 19. The inflow cylinder 13 and the first transfer pipe 2 are thus coupled to each other. Similarly, flanges 20 and 21 are provided at a right end of the outflow cylinder 14 and a left end of the second transfer pipe 3, respectively. The flanges 20 and 21 of the outflow cylinder 14 and second transfer pipe 3 are abutted with each other, a bolt 23 is passed through bolt holes 22 provided in the flanges 20 and 21, and then the flanges 20 and 21 are fastened by a nut 24. The outflow cylinder 14 and the second transfer pipe 3 are thus coupled to each other. A coupled portion between the inflow cylinder 13 and the first transfer pipe 2 is sealed with a ring-shaped packing 25. Similarly, a coupled portion between the outflow cylinder 14 and the second transfer pipe 3 is sealed with a ring-shaped packing 26. An axial direction of the inflow cylinder 13 and the outflow cylinder 14 is oriented in a left-right horizontal direction.

Figure 12:
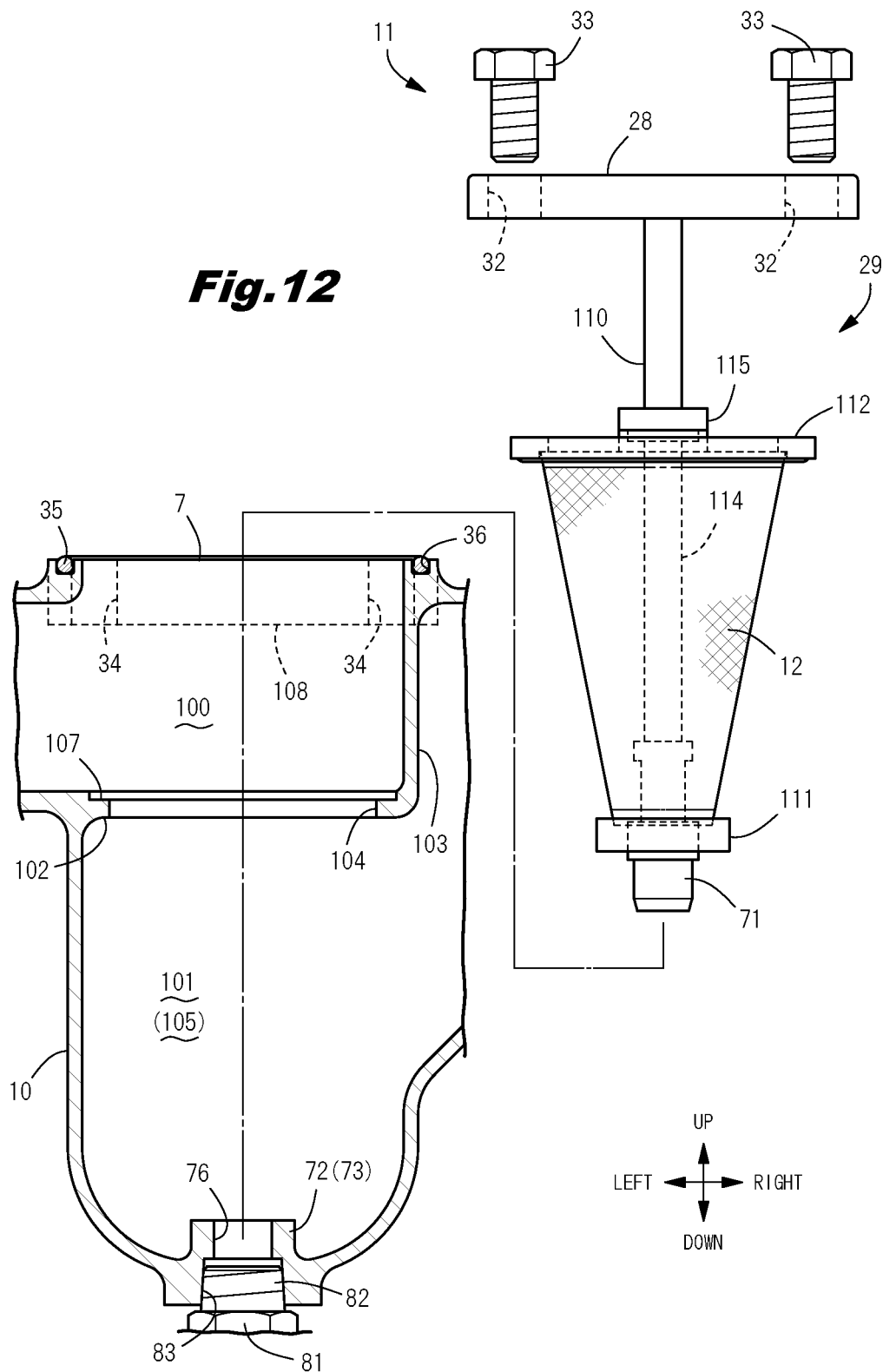
FIG. 12 is an exploded front view of a main part of the inline-type strainer, illustrating a state in which a lid is removed from the housing.

As illustrated in FIG. 11, the filter chamber 8 formed in the housing 10 communicates with the inflow port 5 and is divided into a primary-side flow path 100 through which the liquid before being filtered by the screen 12 flows and a secondary-side flow path 101 in which the screen 12 is disposed and through which the liquid after being filtered flows. The primary-side flow path 100 has a straight shape continuous with the inflow port 5, and the access hole 7 is opened in an upper part of the primary-side flow path 100. The access hole 7 is formed mainly for taking out the screen 12 from the filter chamber 8 and cleaning the inside of the filter chamber 8, and has a circular shape in plan view (see FIG. 17). As illustrated in FIGS. 11 and 12, the primary-side flow path 100 and the secondary-side flow path 101 are partitioned by a bottom wall 102 extending in the horizontal direction and a partition wall 103 extending in an up-down direction, and a communication port 104 for inserting the screen is opened in the bottom wall 102. On a peripheral edge of the communication port 104 on an upper surface of the bottom wall 102, a step 107 having an annular surface that receives a receiving piece 121 of a second support 112 to be described later is recessed.

The secondary-side flow path 101 includes a vertical flow path 105 extending downward and in which the screen 12 is disposed, and a horizontal flow path 106 continuous with the vertical flow path 105 and extending in a lateral direction. A downstream end of the horizontal flow path 106 communicates with the outflow port 6. By the primary-side flow path 100 and the secondary-side flow path 101 as described above, the filter chamber 8 having a meandering internal flow path is formed inside the housing 10.

As illustrated in FIG. 12, the lid 11 detachably attached to the access hole 7 includes a square lid body 28 that seals the access hole 7 and a screen support structure 29 that supports the screen 12 to be attachable and detachable. Bolt holes 32 are formed at four corners of the lid 11, and screw holes 34 are formed at four corners of a flange 108 formed on an upper surface of the housing 10 so as to correspond to the bolt holes 32 (see FIGS. 12 and 17). The lid 11 can be fixed and attached to the housing 10 by aligning the bolt holes 32 and the screw holes 34 and then by screwing the bolts 33 into the screw holes 34 in the housing 10 side through the bolt holes 32 in the lid 11 side. In FIGS. 11 and 12, a reference sign 35 denotes a water shut-off packing attached to the inside of the recessed groove 36 formed in an opening peripheral edge of the access hole 7 of the housing 10. The water shut-off packing 35 seals a gap between a lower surface of the lid 11 and an upper surface of the housing 10 during fixing and attaching.

Figure 13:
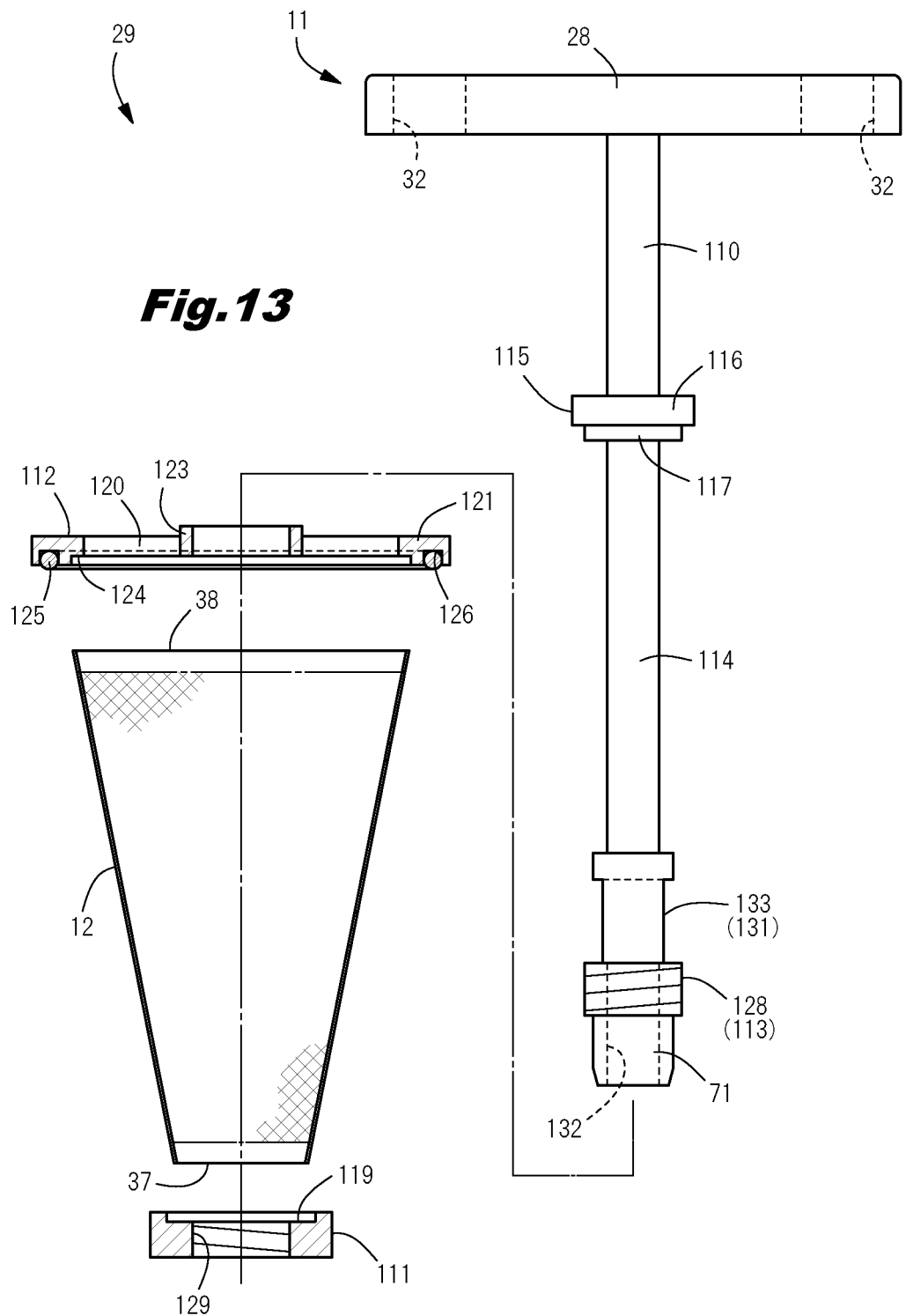
FIG. 13 is an exploded front view of a screen support structure.
Figure 14:
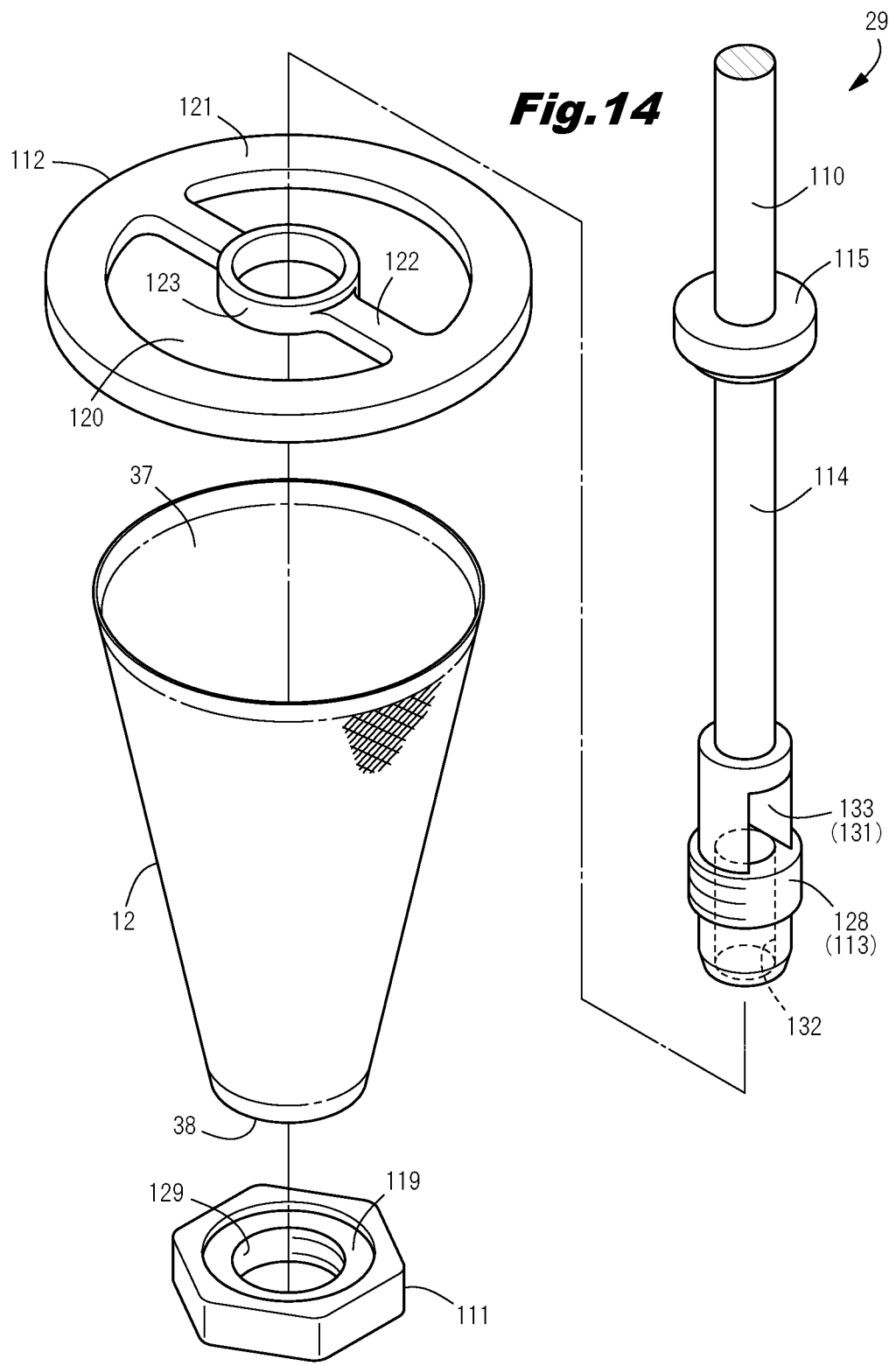
FIG. 14 is an exploded perspective view of the screen support structure.

As illustrated in FIGS. 13 and 14, the screen 12 includes a stainless steel mesh having a large number of microholes, as a material, has a small diameter portion on a lower side and a large diameter portion on an upper side, and has a bottomless tapered cylindrical shape having openings 37 and 38 at both upper and lower ends. As shown in FIG. 11, the liquid flowing into the filter chamber 8 from the inflow port 5 passes through the primary-side flow path 100, passes through the screen 12, then passes through the secondary-side flow path 101, and is discharged from the outflow port 6. At this time, a cylindrical inner surface of the screen 12 is a primary side of filtration, a cylindrical outer surface is a secondary side of filtration, and solid foreign matters and the like are caught on the cylindrical inner surface. Further, solid foreign matters or the like deposited on the primary side of the screen 12 can be discharged to the outside of the housing 10 through a drain line 74 described later.

In FIGS. 13 and 14, the screen support structure 29 includes a support column 110 that extends downward from the lid body 28 and reaches a bottom surface of the filter chamber 8, a first support 111 that is provided at a lower end of the support column 110 and supports an opening edge on the lower side of the screen 12, a second support 112 that is provided in a midway portion of the support column 110 and supports an opening edge on the upper side of the screen 12, and a coupling structure 113 that couples the support column 110 and the first support 111 to be attachable to and detachable from each other.

The support column 110 includes a columnar body 114 having a cylindrical shape extending downward from the lid body 28, and a stopper wall 115 protruding outward in a flange shape above the columnar body 114. The stopper wall 115 has a multistage shape including a large diameter portion 116 on the upper side and a small diameter portion 117 on the lower side. The first support 111 has a thin cylindrical shape with a hexagonal outer periphery, and a receiving surface 119 that receives an opening edge of the screen 12 on an outflow side (lower side) is recessed in a stepped manner on a cylindrical end surface on the upper side.

The second support 112 includes a frame-shaped receiving piece 121 having a disk shape and provided with a circular opening 120 that allows the liquid to flow into the primary side of the screen 12 at a center of a board surface, and a lateral piece 122 that connects opposing frames of the receiving piece 121 so as to partition the opening 120. An engaging cylinder wall 123 externally fitted and connected to the small diameter portion 117 of the stopper wall 115 is formed at a center of the lateral piece 122. A receiving surface 124 directed downward is formed on an inner peripheral edge of the receiving piece 121 on a side close to the screen 12, and an opening edge of the screen 12 on the side close to the inflow port 5 (upper side) is received by the receiving surface 124. In FIG. 13, a reference sign 125 denotes a water shut-off packing attached to inside of a recessed groove 126 formed in a lower surface of the receiving piece 121, and the water shut-off packing 125 seals a gap between the bottom wall 102 of the primary-side flow path 100 and the receiving piece 121 of the second support 112 when the screen 12 is attached.

As illustrated in FIGS. 13 and 14, the coupling structure 113 includes an external screw 128 formed at the lower end of the support column 110 and an internal screw 129 formed on a cylindrical inner surface of the first support 111.

In the screen support structure 29 configured as described above, the support column 110 is inserted into the engaging cylinder wall 123 from above the second support 112, the support column 110 is inserted into the screen 12 from the opening 38 of the screen 12 on the side close to the inflow port 5 (upper side), and thus the lower end of the support column 110 protrudes from the opening 37 of the screen 12 on the side close to the outflow port 6 (lower side). Next, after the first support 111 is inserted into the lower end of the support column 110 protruding from the screen 12, the first support 111 is pushed upward while being rotated. As a result, the internal screw 129 of the first support 111 is screwed with the external screw 128 of the support column 110, and the first support 111 can be coupled to the support column 110 by the coupling structure 113. As described above, the screen 12 can be fixed to the lid 11 with the screen 12 sandwiched and held between the first support 111 and the second support 112. Further, the first support 111 is rotated in an opposite direction from a direction of the above rotation to release a coupling state between the support column 110 and the first support 111, and then the support column 110 is pulled out from inside of the screen 12. Accordingly, the screen 12 can be separated from the lid 11.

Figure 15:
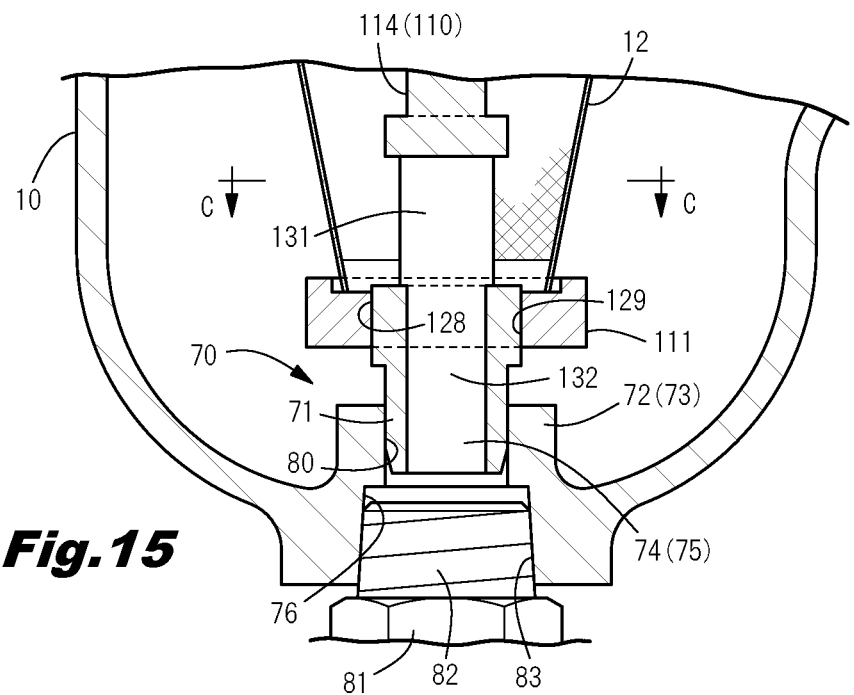
FIG. 15 is a longitudinal sectional front view of a main part of the inline-type strainer.
Figure 16:
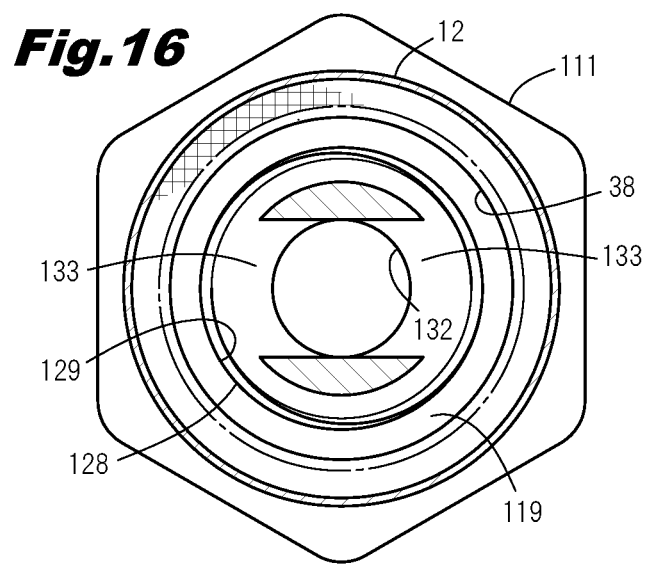
FIG. 16 is a sectional view taken along line C-C in FIG. 15.
Figure 17:
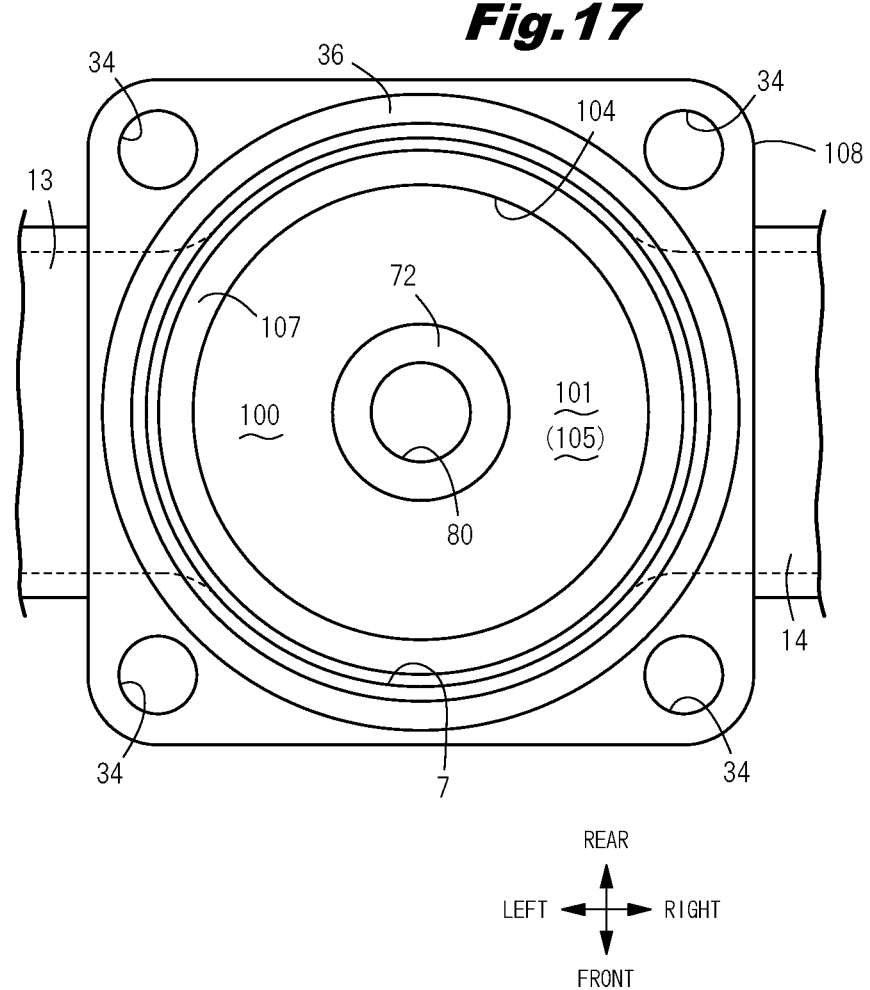
FIG. 17 is a plan view of the housing.

A lid coupling mechanism 70 for coupling the housing 10 and the lid 11 when the lid 11 is attached to the housing is provided between the housing 10 and the lid 11. As illustrated in FIG. 15, in the lid coupling mechanism 70 according to the present embodiment, the lower end of the support column 110 is an upper coupling element 71, and a boss 72 protruding from a bottom surface of the housing 10 and externally fitting and holding the upper coupling element 71 is a lower coupling element 73. That is, the lid coupling mechanism 70 according to the present embodiment includes the upper coupling element 71 formed at the lower end of the support column 110 and the lower coupling element 73 including the boss 72 protruding from the bottom surface of the housing 10.

Inside the lid coupling mechanism 70, the drain line 74 for discharging solid foreign matters or the like deposited on the primary side of the screen 12 to the outside of the housing 10 is provided. The drain line 74 includes an upper discharge flow path 75 formed in the upper coupling element 71 and a lower discharge flow path 76 formed in the lower coupling element 73 and reaching the outside of the housing 10. As illustrated in FIG. 15, a lower part of the support column 110 has a hollow cylindrical shape, in which a first discharge flow path 131 communicating with the inside of the screen 12 and a second discharge flow path 132 communicating with the first discharge flow path 131 are formed. Specifically, openings 133 are formed so as to face each other at two positions on a cylinder wall of the support column 110 located above the external screw 128 of the upper discharge flow path 75 (see FIGS. 14 and 16), and an upper half part of the upper discharge flow path 75 including the openings 133 serves as the first discharge flow path 131 communicating with the inside of the screen 12. A lower half part of the upper discharge flow path 75 serves as a second discharge flow path 132 communicating with the first discharge flow path 131.

As illustrated in FIG. 15, an attachment portion 80 that allows entry of the lower end of the support column 110 is formed at an upper end of the boss 72, and an internal screw 83 with which an external screw 82 of a connection nipple 81 is screwed is formed at a lower end of a discharge port of the housing 10 communicating with the boss 72. A drain valve 84 controlling opening and closing of the drain line 74 is coupled to the connection nipple 81. The drain valve 84 can be controlled to open and close by manually rotating a handle 85. When the handle 85 is in a horizontal orientation, the drain valve 84 is in a closed state to close the drain line 74. When the handle 85 is rotated downward by 90 degrees from the horizontal posture, the drain valve 84 can be in an open state to open the drain line 74. By opening the drain line 74 in this manner, a part of the liquid received from the opening 38 of the screen 12 on the side closer to the inflow port 5 (lower side) can be sent out to the outside of the housing 10 through the drain line 74 including the upper discharge flow path 75 and the lower discharge flow path 76. At this time, the solid foreign matters and the like adhering to the primary side (filter surface) of the screen 12 can be discharged from the drain line 74 to the outside of the housing 10 together with the liquid to clean the screen 12. At this time, by arranging a bucket or the like below the drain valve 84 in advance, the solid foreign matters or the like discharged from the drain line 74 can be received by the bucket or the like.

As described above, since the strainer according to the present embodiment includes the drain line 74 for discharging the solid foreign matters or the like deposited on the primary side of the screen 12 to outside of the housing 10, the filter surface can be reproduced by cleaning in a state where the screen 12 is installed in the housing 10. Further, in the strainer according to the present embodiment, the screen 12 is supported to be attachable to and detachable from the lid 11, and the screen 12 can be entirely taken out to the outside of the housing 10 through the access hole 7 when the lid 11 is removed from the housing 10. Thus, the filter surface can be reproduced by cleaning the screen 12 outside the housing 10. As described above, in the strainer according to the present embodiment, two ways of cleaning can be performed, that is, the screen 12 can be cleaned through the drain line 74 and the screen 12 can be cleaned outside the housing 10. Thus, for example, the screen 12 is first cleaned through the drain line 74, and then when the screen 12 is not unclogged by the cleaning, the screen 12 is taken out to the outside of the housing 10 to be cleaned. Thus, the screen 12 can be optimally cleaned in accordance with usage and a clogging state. The screen 12 is cleaned through the drain line 74 daily, and the screen 12 is taken out to the outside of the housing 10 to be cleaned once in several months or weeks. In this case, the screen 12 can be cleaned optimally in accordance with the usage and the clogging state. Furthermore, the filter surface can be reproduced by taking out the screen 12 to the outside of the housing 10 and replacing the screen 12. As described above, since the screen 12 can be appropriately cleaned and replaced in accordance with the usage and the clogging state, the strainer having an excellent function of reproducing the filter surface can be obtained.

In addition, as described above, in the strainer according to the present embodiment, the lid coupling mechanism 70 that couples the housing 10 and the lid 11 when the lid 11 is attached to the housing 10 is provided between the bottom surface of the housing 10 facing the filter chamber 8 and the lower end of the lid 11. The lower discharge flow path 76 is formed in the lower coupling element 73 on the side close to the housing 10 constituting the lid coupling mechanism 70, and the upper discharge flow path 75 is formed in the upper coupling element 71 on the side close to the lid 11 constituting the lid coupling mechanism 70. When the lid 11 is attached to the housing 10, the coupling state is established between the upper and lower coupling elements 71 and 73, the upper and lower discharge flow paths 75 and 76 communicate with each other, and thus the drain line 74 is constructed. When the lid 11 is removed from the housing 10, the coupling state between the upper and lower coupling elements 71 and 73 is released. In this configuration, the drain line 74 can be constructed only by attaching the lid 11 to the housing 10, and the drain line 74 can be disassembled only by removing the lid 11 from the housing 10 in a reverse procedure. Therefore, the strainer according to the present embodiment completely eliminates the need for constructing or disassembling the drain line 74 inside of the narrow housing 10, the drain line 74 can be constructed or disassembled easily and quickly with a single touch by simply attaching or detaching the lid 11 to or from the housing 10, and the strainer excellent in terms of assembly and maintenance can be obtained.

Further, since the access hole 7 is opened in the upper part of the housing 10, the liquid does not leak from the housing 10 when the lid 11 is removed. Therefore, the liquid in the housing 10 need not be discharged every time the screen 12 is taken out, and the screen can be cleaned more quickly outside the housing 10.

In the screen support structure 29 according to the present embodiment, only the support column 110 is fixed to the lid body 28, and the screen 12 is sandwiched and held between the first support 111 and the second support 112. Thus, by simply releasing the coupling state of the first support 111 to the support column 110 by the coupling structure 113, the first support 111, the second support 112, and the screen 12 can be separated from the lid body 28 and the support column 110. In a reverse procedure, by establishing the coupling state of the first support 111 to the support column 110 by the coupling structure 113, the first support 111, the second support 112, and the screen 12 can be coupled to the lid body 28 and the support column 110. Therefore, the screen 12 can be easily separated from the lid body 28 to be cleaned, and an inline-type strainer excellent in terms of assembly and maintenance can be obtained.

The coupling structure 113 including the external screw 128 provided at a distal end of the support column 110 and the internal screw 129 formed on the inner surface of the cylindrical first support 111 can simplify the coupling structure 113, and suppress the manufacturing cost of the inline-type strainer.

Figure 18:
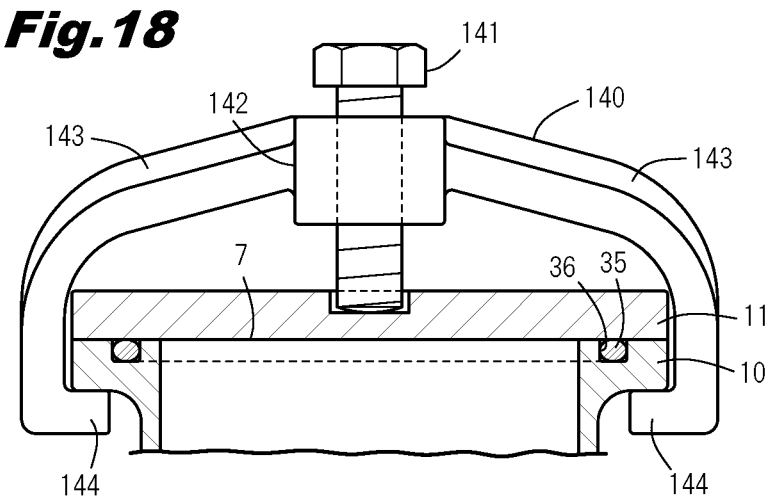
FIG. 18 is a longitudinal sectional side view illustrating another structure of the lid.

In the above embodiment, the lid 11 is fixed to the housing 10 by fastening and fixing the bolts 33, but the present invention is not limited to this, and the lid 11 may be fixed to the housing 10 by a lid support 140 as shown in FIG. 18. The lid support 140 in FIG. 18 is constituted by a cast product integrally including a hub 142 having an internal screw with which an external screw of an operation bolt 141 is screwed and engaged, a pair of arms 143 and 143 extending from an outer periphery of the hub 142, and retaining claws 144 provided at tips of the arms 143 and extending inward. After the retaining claws 144 are engaged with the housing 10, the operation bolt 141 is rotated and displaced downward, and thus the lid 11 can be pushed down to fix the lid 11 to the housing 10.

REFERENCE SIGNS LIST

1 Inline-type strainer
5 Inflow port
6 Outflow port
7 Access hole
8 Filter chamber
10 Housing
11 Lid
12 Screen
28 Lid body
29 Screen support structure
37 Opening
38 Opening
39 First support
40 Support shaft
41 Second support
42 First coupling structure
43 Second coupling structure
45 Base end
46 Screen receiver
47 Free end
51 Opening
52 Receiving piece 53 Lateral piece
54 Regulating side
60 External screw
61 External screw
62 Through-hole
64 Nut
66 Internal screw
70 Lid coupling mechanism
71 Upper coupling element
73 Lower coupling element
75 Upper discharge flow path
76 Lower discharge flow path
77 First discharge flow path
78 Second discharge flow path
90 Guide vane
91 First supply path (fluid supply path)
92 Second supply path (fluid supply path)
93 Third supply path (fluid supply path)
110 Support column
111 First support
112 Second support
113 Coupling structure
128 External screw
129 Internal screw
131 First discharge flow path
132 Second discharge flow path

The invention claimed is:

1. An inline-type strainer comprising:
a housing having an inflow port opened at a first end in a left-right direction, an outflow port opened at a second end in the left-right direction, and an access hole opened in an upper part, the housing including a filter chamber inside extending from the inflow port toward the outflow port;
a lid configured to be attachable to and detachable from the housing to seal the access hole;
a screen disposed in the filter chamber and configured to filter a liquid flowing in through the inflow port;
a drain line extending from a primary side of the screen to an outside of the housing and configured to discharge filtered residues adhering to a filter surface of the screen to the outside of the housing; and
a drain valve configured to control opening and closing of the drain line, wherein
the screen is supported to be attachable to and detachable from the lid,
when the lid is removed from the housing, the screen is configured to be entirely taken out to the outside of the housing through the access hole,
a lid coupling mechanism coupling the housing and the lid to each other when the lid is attached to the housing is disposed between a bottom surface of the housing facing the filter chamber and a lower end of the lid,
a lower discharge flow path is disposed in a lower coupling element on a side close to the housing constituting the lid coupling mechanism,
an upper discharge flow path is disposed in an upper coupling element on a side close to the lid constituting the lid coupling mechanism,
when the lid is attached to the housing, a coupling state is established between the upper coupling element and the lower coupling element, the upper discharge flow path and the lower discharge flow path communicate with each other, and thus the drain line is constructed, and
when the lid is removed from the housing, the coupling state between the upper coupling element and the lower coupling element is released.

2. The inline-type strainer according to claim 1, wherein
the screen has a bottomless cylindrical shape with a cylindrical inner surface as a primary side and a cylindrical outer surface as a secondary side,
the lid includes a lid body sealing the access hole, and a screen support structure supporting the screen to be attachable and detachable,
the screen support structure includes a first support supporting an opening edge of the screen on a side close to the outflow port and a second support supporting an opening edge of the screen on a side close to the inflow port, the first support having a lower end that serves as the upper coupling element,
a lower coupling element externally fitting and holding the lower end of the first support when the lid is attached to the access hole protrudes from a bottom surface of the housing, the bottom surface facing the access hole, and
the upper discharge flow path includes a first discharge flow path communicating with an opening of the screen on the side close to the outflow port, and a second discharge flow path provided inside the first support and communicating with the first discharge flow path.

3. The inline-type strainer according to claim 2, wherein
the screen support structure includes a first support fixed to the lid body and supporting the opening edge of the screen on the side close to the outflow port, a support shaft extending from a midway portion of the first support toward the side close to the inflow port, a second support fixed to a side close to a free end of the support shaft and supporting the opening edge of the screen on the side close to the inflow port, a first coupling structure coupling the first support and the support shaft to be attachable to and detachable from each other, and a second coupling structure coupling the second support and the support shaft to be attachable to and detachable from each other, and
the screen is sandwiched and held between the first support and the second support.

4. The inline-type strainer according to claim 3, wherein
the first support includes a base end extending from the lid body, a screen receiver having a bottomed cylindrical shape, disposed below the base end, supporting the opening edge of the screen on the side close to the outflow port, and closing an opening on the side close to the outflow port, and a free end having a bottomless cylindrical shape and disposed below the screen receiver,
the base end, the screen receiver, and the free end are integrally formed,
the screen receiver is provided with a first discharge flow path, and
the free end is provided with a second discharge flow path.

5. The inline-type strainer according to claim 3, wherein
the second support includes a receiving piece having a frame shape and provided with an opening that allows liquid to flow into a primary side of the screen at a center of a board surface, and a lateral piece connecting opposing frames of the receiving piece to partition the opening, and
the receiving piece has an upper edge provided with a regulating side for preventing rotation, the regulating side being received by an inner surface of the lid body.

6. The inline-type strainer according to claim 5, wherein
the support shaft is a stud bolt having external screws at both ends, the first coupling structure includes the external screw provided at a first end of the stud bolt, a through-hole provided in a screen receiver and allowing insertion of the external screw, and a nut into which the external screw is screwed, the external screw protruding toward the outflow port through the through-hole, and the second coupling structure includes the external screw provided at a second end of the stud bolt, and an internal screw provided in the lateral piece and screwed with the external screw.

7. The inline-type strainer according to claim 1, wherein the screen has a bottomless cylindrical shape with a cylindrical inner surface as a primary side and a cylindrical outer surface as a secondary side, the lid includes a lid body sealing the access hole, and a screen support structure supporting the screen to be attachable and detachable, the screen support structure includes a support column extending downward from the lid body, a first support provided at a lower end of the support column and supporting an opening edge on a lower side of the screen, a second support provided at a midway portion of the support column and supporting an opening edge on an upper side of the screen, and a coupling structure coupling the support column and the first support to be attachable to and detachable from each other, the lower end of the support column serving as the upper coupling element, a lower coupling element externally fitting and holding the lower end of the support column when the lid is attached to the access hole protrudes from a bottom surface of the housing, the bottom surface facing the access hole, the upper discharge flow path includes a first discharge flow path communicating with an opening on the lower side of the screen and a second discharge flow path provided inside the support column and communicating with the first discharge flow path, and the screen is sandwiched and held between the first support and the second support.

8. The inline-type strainer according to claim 7, wherein the coupling structure includes an external screw provided at a distal end of the support column and an internal screw disposed on an inner surface of the first support having a cylindrical shape.

9. The inline-type strainer according to claim 2, wherein a guide vane configured to generate a swirling flow inside the screen is disposed upstream of a filter chamber.

10. The inline-type strainer according to claim 9, wherein the housing defining the filter chamber includes fluid supply paths configured to pump a fluid into the filter chamber and generate a turbulent flow outside the screen during cleaning with use of a drain line.

* * * * *